(12) United States Patent
Meng et al.

(10) Patent No.: US 12,056,458 B2
(45) Date of Patent: Aug. 6, 2024

(54) TRANSLATION METHOD AND APPARATUS BASED ON MULTIMODAL MACHINE LEARNING, DEVICE, AND STORAGE MEDIUM

(71) Applicant: Tencent Technology (Shenzhen) Company Limited, Shenzhen (CN)

(72) Inventors: Fandong Meng, Shenzhen (CN); Yongjing Yin, Shenzhen (CN); Jinsong Su, Shenzhen (CN); Jie Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 346 days.

(21) Appl. No.: 17/719,170

(22) Filed: Apr. 12, 2022

(65) Prior Publication Data
US 2022/0245365 A1    Aug. 4, 2022

Related U.S. Application Data

(63) Continuation of application No. PCT/CN2021/091114, filed on Apr. 29, 2021.

(30) Foreign Application Priority Data

May 20, 2020    (CN) .......................... 202010432597.2

(51) Int. Cl.
*G06F 40/58* (2020.01)
*G06F 40/205* (2020.01)
*G06F 40/51* (2020.01)

(52) U.S. Cl.
CPC ............ *G06F 40/58* (2020.01); *G06F 40/205* (2020.01); *G06F 40/51* (2020.01)

(58) Field of Classification Search
CPC ......... G06F 40/58; G06F 40/205; G06F 40/51
See application file for complete search history.

(56) References Cited

U.S. PATENT DOCUMENTS 9,560,415 B2    1/2017  Good et al.
11,562,744 B1*  1/2023  Gao ....................... G10L 13/033
(Continued)

FOREIGN PATENT DOCUMENTS

| CN | 105869007 A | 8/2016 |
|---|---|---|
| CN | 105916050 A | 8/2016 |

(Continued)

OTHER PUBLICATIONS

Tencent Technology, WO, PCT/CN2021/091114, Jul. 30, 2021, 5 pgs.

(Continued)

*Primary Examiner* — Fan S Tsang
*Assistant Examiner* — David Siegel
(74) *Attorney, Agent, or Firm* — Morgan, Lewis & Bockius LLP

(57) ABSTRACT

A computer device acquires a semantic association graph associated with n source statements belonging to different modals. The semantic association graph includes n semantic nodes of the different modals, a first connecting edge used for connecting the semantic nodes of a same modal and a second connecting edge used for connecting the semantic nodes of different modals. The computer device extracts a plurality of first word vectors from the semantic association graph. The device encodes the plurality of first word vectors to obtain n encoded feature vectors. The device also decodes the n encoded feature vectors to obtain a translated target statement.

20 Claims, 10 Drawing Sheets

(56) References Cited

U.S. PATENT DOCUMENTS

| | | | |
|---|---|---|---|
| 2006/0123358 A1 | 6/2006 | Lee et al. | |
| 2014/0236570 A1 | 8/2014 | Heck et al. | |
| 2016/0378861 A1* | 12/2016 | Eledath | G06V 20/52 707/766 |
| 2018/0314689 A1 | 11/2018 | Wang et al. | |
| 2019/0287012 A1 | 9/2019 | Celikyilmaz et al. | |
| 2020/0242146 A1* | 7/2020 | Kalukin | G06F 16/3329 |

FOREIGN PATENT DOCUMENTS

| | | |
|---|---|---|
| CN | 106202317 A | 12/2016 |
| CN | 108124184 A | 6/2018 |
| CN | 108462889 A | 8/2018 |
| CN | 109034115 A | 12/2018 |
| CN | 111652678 A | 9/2020 |

OTHER PUBLICATIONS

Tencent Technology, IPRP, PCT/CN2021/091114, Nov. 17, 2022, 6 pgs.
Tencent Technology, Japanese Office Action, JP Patent Application No. 2022-540553, Aug. 28, 2023, 8 pgs.
Tencent Technology, ISR, PCT/CN2021/092710, Aug. 10, 2021, 3 pgs.

* cited by examiner

TRANSLATION METHOD AND APPARATUS BASED ON MULTIMODAL MACHINE LEARNING, DEVICE, AND STORAGE MEDIUM

CROSS-REFERENCE TO RELATED APPLICATIONS

This application is a continuation application of PCT Patent Application No. PCT/CN2021/091114, entitled "MULTIMODAL MACHINE LEARNING-BASED TRANSLATION METHOD, DEVICE, EQUIPMENT, AND STORAGE MEDIUM" filed on Apr. 29, 2021, which claims priority to Chinese Patent Application No. 202010432597.2, filed with the State Intellectual Property Office of the People's Republic of China on May 20, 2020, and entitled "TRANSLATION METHOD AND APPARATUS BASED ON MULTIMODAL MACHINE LEARNING, DEVICE, AND STORAGE MEDIUM", all of which are incorporated herein by reference in their entirety.

FIELD OF THE TECHNOLOGY

This application relates to the technical field of artificial intelligence, in particular to a translation method, apparatus and device based on multimodal machine learning, and a storage medium.

BACKGROUND OF THE DISCLOSURE

Machine translation is a process of using computers to convert one natural language into another natural language.

In some application scenarios, a machine translation model can be used to translate source languages of different representations into target languages, that is, translating multimodal source languages into target languages. Exemplarily, pictures and corresponding English annotations are acquired; features of the pictures and the English annotations are extracted respectively through a machine translation model; the extracted features are then fused; and translation is performed on the basis of a fused feature to obtain French annotations corresponding to the pictures and the English annotations.

SUMMARY

Embodiments of this application provide a translation method, apparatus and device based on multimodal machine learning, and a storage medium, which can perform full semantic fusion on source languages in multiple modals in a feature encoding process so that a target statement decoded by an encoding vector is closer to the content and emotion expressed by the source languages. The technical solutions are as follows.

According to one aspect of this application, a translation method based on multimodal machine learning is executed by a computer device. The method comprises:

acquiring (e.g., building) a semantic association graph associated with (e.g., on the basis of) n source statements belonging to different modals, the semantic association graph comprising n semantic nodes of the different modals, a first connecting edge used for connecting the semantic nodes of a same modal, and a second connecting edge used for connecting the semantic nodes of different modals, the semantic nodes being used for expressing one semantic unit of the source statement under one modal, and n being a positive integer greater than 1;

extracting a plurality of first word vectors from the semantic association graph;

encoding the plurality of first word vectors to obtain n encoded feature vectors; and decoding the n encoded feature vectors to obtain a translated target statement.

According to another aspect of this application, a translation apparatus based on multimodal machine learning. The apparatus comprises:

a semantic association module configured to build, on the basis of n source statements belonging to different modals, a semantic association graph, the semantic association graph comprising n semantic nodes of different modals, a first connecting edge used for connecting the semantic nodes of a same modal, and a second connecting edge used for connecting the semantic nodes of different modals, the semantic nodes being used for expressing one semantic unit of the source statement under one modal, and n being a positive integer greater than 1;

a feature extraction module configured to extract a plurality of first word vectors from the semantic association graph;

a vector encoding module configured to encode the plurality of first word vectors to obtain n encoded feature vectors;

a vector decoding module configured to decode the n encoded feature vectors to obtain a translated target statement.

According to another aspect of this application, a computer device is provided. The computer device comprises:

a memory;

a processor connected to the memory;

the processor being configured to load and execute an executable instruction to implement the translation method based on multimodal machine learning in one of the above aspects and/or any of the embodiments disclosed herein.

According to another aspect of this application, a non-transitory computer-readable storage medium. The non-transitory computer-readable storage medium stores at least one instruction, at least one program, a code set or an instruction set. The above at least one instruction, at least one program, the code set or the instruction set is loaded and executed by a processor to implement the translation method based on multimodal machine learning in one of the above aspects and/or any of the embodiments disclosed herein.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
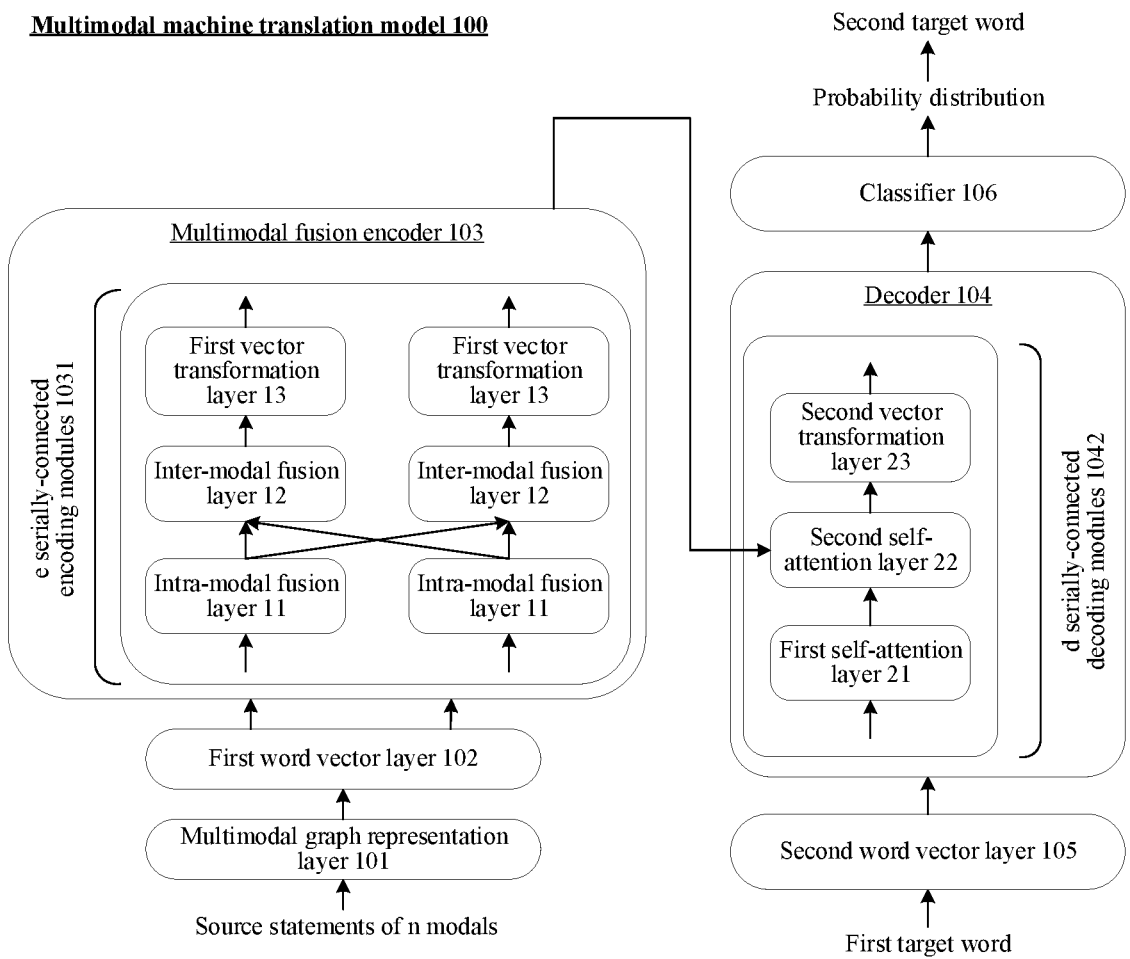
FIG. 1 is a schematic structural diagram of a multimodal machine translation model provided in one exemplary embodiment of this application.

To make objectives, technical solutions, and advantages of this application clearer, the following further describes implementations of this application in detail with reference to the accompanying drawings.

The terms involved in this application are explained as follows:

Artificial Intelligence (AI): It is a theory, method, technology and technological science applying systems that uses a digital computer or a machine controlled by a digital computer to simulate, extend and expand human intelligence, sense the environment, acquire knowledge, and use the knowledge to obtain best results. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

The artificial intelligence technology is a comprehensive discipline involving a wide range of fields, including a hardware-level technology and a software-level technology. Basic AI technologies generally include technologies such as sensors, dedicated AI chips, cloud computing, distributed storage, big data processing technologies, operating/interaction systems, and mechatronics. AI software technologies mainly include several major directions such as a computer vision technology, a speech processing technology, a natural language processing technology, and machine learning/deep learning (DL).

Natural language processing (NLP) is an important direction in the field of computer technologies and the field of AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. NLP technologies usually include text processing, semantic understanding, machine translation, robot question answering, knowledge graphs and other technologies.

Machine learning (ML) is an area that involves many fields and many disciplines such as probability theory, statistics, an approximation theory, a convex analysis, and an algorithm complexity theory. The ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. Machine learning and deep learning usually include artificial neural networks, belief networks, reinforcement learning, transfer learning, inductive learning, analogical learning, and other technologies.

This application provides a multimodal machine translation model, which can accurately translate source statements of n different modals into target statements. The modal refers to an expression form of a language. Multimodality is the application of multiple literacies within one medium. For example, understanding a televised weather forecast (medium) involves understanding spoken language, written language, weather specific language (such as temperature scales), geography, and symbols (clouds, sun, rain, etc.). Multiple literacies or "modes" contribute to an audience's understanding of a composition. As another example, a statement can be represented by a graph, a graphic (e.g., an image) or as text. The source statement refers to a statement-to-be-translated including a text-form sentence-to-be-translated of a first language class and a non-text-form language-to-be-translated. The target statement refers to a text-form translated sentence of a second language class, and the second language class is different from the first language class. Exemplarily, the source statement includes an English statement and an illustration of the English statement. A Chinese statement corresponding to the above English statement and the illustration thereof can be obtained by translation through a multimodal machine translation model.

As shown in FIG. 1, a schematic structural diagram of a multimodal machine translation model 100 provided in one exemplary embodiment of this application is illustrated. The multimodal machine translation model 100 includes a multimodal graph representation layer 101, a first word vector layer 102, a multimodal fusion encoder 103 and a decoder 104.

The multimodal graph representation layer 101 is configured to semantically associate source languages of n different modals (e.g., written text, spoken words, images, text or words comprising different languages, symbols, etc.) to acquire a semantic association graph. The semantic association graph includes semantic nodes of n different modals, a first connecting edge used for connecting the semantic nodes of a same modal, and a second connecting edge used for connecting the semantic nodes of different modals, and n being a positive integer greater than 1. One semantic node is used for representing a semantic unit of the source statement under one modal. English is taken as an example. One semantic node corresponds to one word. Chinese is taken as an example. One semantic node corresponds to one Chinese character.

The first word vector layer 102 is configured to extract a plurality of first word vectors from the semantic association graph.

The multimodal fusion encoder 103 is configured to encode the plurality of first word vectors to obtain n encoded feature vectors.

The decoder 104 is configured to decode the n encoded feature vectors to obtain a translated target statement.

In some embodiments, the multimodal graph representation layer 101 is configured to acquire n groups of semantic nodes, one group of semantic nodes corresponding to a source statement of one modal; add a first connecting edge between any two semantic nodes in the same modal, and add a second connecting edge between any two semantic nodes of different modals, so as to obtain the semantic association graph.

In some embodiments, the multimodal graph representation layer 101 is configured to extract semantic nodes from the source language of each modal to obtain n groups of semantic nodes corresponding to the source languages of then modals.

The multimodal graph representation layer 101 is configured to connect the semantic nodes in the same modal from among the n groups of semantic nodes by using the first connecting edge, and connect the semantic nodes in different modals from among the n groups of semantic nodes by using the second connecting edge, so as to obtain the semantic association graph.

In some embodiments, the source statements of the n modals include a text-form first source statement and a non-text-form second source statement, and the n groups of semantic nodes include a first semantic node and a second semantic node.

The multimodal graph representation layer 101 is configured to acquire the first semantic node, the first semantic node being obtained by processing the first source statement; acquire candidate semantic nodes, the candidate semantic nodes being obtained by processing the second source statement; acquire a first probability distribution of the candidate semantic nodes, the first probability distribution being calculated according to a semantic association between the first semantic node and the candidate semantic nodes; determine the second semantic node from among the candidate semantic nodes, the second semantic node being determined by the multimodal graph representation layer according to the first probability distribution.

In some embodiments, the multimodal graph representation layer 101 is configured to extract a first semantic node from the first source statement, and extract candidate semantic nodes from the second source statement; calculate a first probability distribution of the candidate semantic nodes according to a semantic association between the first semantic node and the candidate semantic nodes; determine a second semantic node from the candidate semantic nodes according to the first probability distribution.

In some embodiments, the multimodal graph representation layer 101 is configured to add an $i^{th}$ type of first connecting edge between any two semantic nodes in the same modal from among an $i^{th}$ group of semantic nodes, the $i^{th}$ type of first connecting edge corresponding to an $i^{th}$ modal, and i being a positive integer less than or equal to n.

That is, the multimodal graph representation layer 101 is configured to determine the $i^{th}$ type of first connecting edge corresponding to the $i^{th}$ modal, and the $i^{th}$ type of first connecting edge is used for connecting the semantic nodes in the same modal from among the $i^{th}$ group of semantic nodes, i being a positive integer less than or equal to n.

In some embodiments, the n encoded feature vectors are acquired through the following process: performing intra-modal fusion and inter-modal fusion on the plurality of first word vectors for e times to obtain the encoded feature vector. The intra-modal fusion refers to semantic fusion between the first word vectors of the same modal, and the inter-modal fusion refers to semantic fusion between the first word vectors of different modals, e being a positive integer.

In some embodiments, the multimodal fusion encoder 103 includes e serially-connected encoding modules 1031. Each encoding module 1031 includes n intra-modal fusion layers 11 and n inter-modal fusion layers 12 corresponding to the n modals one to one, e being a positive integer.

The first encoding module 1031 is configured to input the first word vectors into the n intra-modal fusion layers 11 in the first encoding module respectively, and perform semantic fusion in the same modal on the first word vectors through the n intra-modal fusion layers 11, respectively, to obtain n first hidden layer vectors. One first hidden layer vector corresponds to one modal, that is, n first hidden layer vectors corresponding to the n modals one to one are obtained.

The first encoding module 1031 is configured to input then first hidden layer vectors into each inter-modal fusion layer 12 in the first encoding module, and perform semantic fusion between different modals on the n first hidden layer vectors through each inter-modal fusion layer 12 to obtain n first intermediate vectors. One intermediate vector corresponds to one modal, that is, n first intermediate vectors corresponding to the n modals one to one are obtained.

The $j^{th}$ encoding module 1031 is configured to perform $j^{th}$ encoding processing on the n first intermediate vectors until the last encoding module outputs n encoded feature vectors. One encoded feature vector corresponds to one modal, that is, until the last encoding module outputs n encoded feature vectors corresponding to the n modals one to one, j being a positive integer greater than 1 and less than or equal to e.

In some embodiments, each encoding module 1031 further includes: n first vector transformation layers 13. One vector transformation layer corresponds to one modal, that is, n first vector transformation layers 13 corresponding to the n modals one to one.

The encoding module 1031 is further configured to input the n first intermediate vectors into the n first vector transformation layers 13 corresponding to the modals to which the first intermediate vectors belong to perform nonlinear transformation, and obtain n first intermediate vectors after nonlinear transformation.

In some embodiments, the hierarchical structure in each encoding module 1031 of the e serially-connected encoding modules 1031 is the same.

In some embodiments, different self-attention functions are used in different intra-modal fusion layers. In some embodiments, identical (e.g., the same) self-attention functions are used in the different intra-modal fusion layers. In some embodiments, different feature fusion functions are used in different inter-modal fusion layers. In some embodiments, identical (e.g., the same) feature fusion functions are used in the different inter-modal fusion layers.

In some embodiments, the multimodal machine translation model 100 further includes a second word vector layer 105 and a classifier 106, and the decoder 104 includes d serially-connected decoding modules 1042, d being a positive integer.

The second word vector layer 105 is configured to acquire a first target word, the first target word being a translated word in the target statement; perform feature extraction on the first target word to obtain a second word vector.

The decoder 104 is configured to perform feature extraction on the second word vector in combination with the encoded feature vectors through the d serially-connected decoding modules 1042 to obtain decoded feature vectors.

The classifier 106 is configured to determine a probability distribution corresponding to the decoded feature vectors, and determine, according to the probability distribution, a second target word behind the first target word.

In some embodiments, each decoding module 1042 of the d serially-connected decoding modules 1042 includes a first self-attention layer 21 and a second self-attention layer 22.

The first decoding module 1042 is configured to input the second word vector into the first self-attention layer 21 in the first decoding module 1042, and perform feature extraction on the second word vector through the first self-attention layer 21 to obtain a second hidden layer vector.

The first decoding module 1042 is configured to input the second hidden layer vector and the encoded feature vectors into the second self-attention layer 22 in the first decoding module 1042, and perform feature extraction in combination with the second hidden layer vector and the encoded feature vectors through the second self-attention layer 22 to obtain a second intermediate vector.

The $k^{th}$ decoding module is configured to input the second intermediate vector into the $k^{th}$ decoding module 1042 for $k^{th}$ decoding processing until the last decoding module outputs the decoded feature vector, k being a positive integer greater than 1 and less than or equal to d.

In some embodiments, each decoding module 1042 further includes: a second vector transformation layer 23.

The decoding module 1042 is configured to input the second intermediate vector into the second vector transformation layer 23 for nonlinear transformation to obtain a second intermediate vector after nonlinear transformation.

To sum up, the multimodal machine translation model provided in this embodiment performs semantic association on the source languages of the n modals through the multimodal graph representation layer to obtain the semantic association graph, uses the first connecting edge to connect the semantic nodes of the same modal in the semantic association graph, and uses the second connecting edge to connect the semantic nodes of different modals; the semantic association between the source languages of multiple modals is fully represented by the semantic association graph, and then the multimodal fusion encoder performs full semantic fusion on the feature vectors in the semantic association graph to obtain the encoded feature vectors after encoding; after the encoded feature vector are decoded, a more accurate target statement is obtained. The target statement is closer to content, emotion, language environment, and the like comprehensively expressed in the multimodal source statements.

Figure 2:
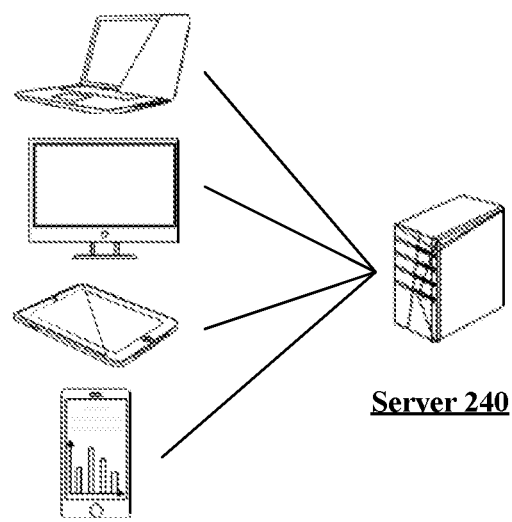
FIG. 2 is a schematic structural diagram of a computer system provided in one exemplary embodiment of this application.

Referring to FIG. 2, a schematic structural diagram of a computer system provided in one exemplary embodiment of this application. The computer system includes a terminal 220 and a server 240.

An operating system is installed on the terminal 220. An application is installed on the operating system and supports a translation function for multimodal source languages. Exemplarily, the above application may include instant messaging software, financial software, game software, shopping software, video playback software, community service software, audio software, education software, payment software, translation software, etc. The translation function for the above multimodal source languages is integrated on the above application.

The terminal 220 and the server 240 are connected to each other through a wired or wireless network. The server 240 includes at least one of a server, multiple servers, a cloud computing platform and a virtualization center. Exemplarily, the server 240 includes a processor and a memory. A computer program is stored in the memory, and the processor reads and executes the above computer program to implement the translation function for the multimodal source languages.

In some embodiments, the server 240 undertakes the primary computing work, and the terminal 220 undertakes the secondary computing work. Alternatively, the server 240 undertakes the secondary computing work, and the terminal 220 undertakes the primary computing work. Alternatively, a distributed computing architecture is used between the server 240 and the terminal 220 to perform collaborative computation.

In some embodiments, the server 240 provides a background service for the application on the terminal 220 in the process of implementing the translation function for the multimodal languages. Exemplarily, the terminal 220 collects the source statements of the n modals and sends the source statements of the above n modals to the server 240, and the server 240 executes the translation method based on multimodal machine learning provided by this application, n being a positive integer greater than 1.

Exemplarily, the terminal 220 includes a data transmission control. The terminal 220 uploads two source statements of different modals, e.g., a statement-to-be-translated and an image matching the statement-to-be-translated, to the server 240 through the above data transmission control, and the server 240 executes the translation based on multimodal machine learning provided by this application to translate the source statements of the two modals into target statements.

In some embodiments, the source statement may include a speech signal. In accordance with a determination that the source statements of the n modals include speech signals, before translating the source statements of the n modals, the terminal 220 or the server 240 first transforms the speech signals into texts. Exemplarily, the terminal 220 collects the speech signals through a microphone, or the terminal 220 receives the speech signals sent by other terminals.

The above translation method based on multimodal machine learning can be applied to a multimedia news translation scenario. Exemplarily, the terminal 220 uploads multimedia news including texts and images to the server 240, and the server 240 executes the translation method based on multimodal machine learning provided in this application to translate characters of the first language class in the multimedia news into characters of the second language class.

The above translation method based on multimodal machine learning can be applied to a foreign literature translation scenario. Exemplarily, the terminal 220 uploads characters in the foreign literature and illustrations corresponding to the characters to the server 240, and the server 240 executes the translation method based on multimodal machine learning provided in this application to translate characters of the first language class in the foreign literature into characters of the second language class.

The above translation method based on multimodal machine learning can be applied to a foreign language website translation scenario. Exemplarily, the terminal 220 collects characters on the foreign language website and character illustrations and uploads the above characters and the character illustrations to the server 240, and the server 240 executes the translation method based on multimodal machine learning provided in this application to translate characters of the first language class in the foreign language website into characters of the second language class.

In some embodiments, the manner in which the terminal 220 displays the translated characters includes a phonetic form or a written form.

In some embodiments, the terminal 220 executes the translation method based on multimodal machine learning provided in this application, and then translates the source statements of n modals.

The terminal 220 may generally refer to one of multiple terminals, and only the terminal 220 is used as an example in this embodiment. The terminal 220 may include: at least one of a smartphone, a tablet computer, an e-book reader, a Moving Picture Experts Group Audio Layer III (MP3) player, a Moving Picture Experts Group Audio Layer 4 (MP4) player, a laptop portable computer, a desktop computer, and a laptop computer. The following embodiments are exemplified by the terminal 220 including a smartphone and a personal computer device.

Those skilled in the art may know that the number of the above terminals 220 may be more or fewer. For example, there may be only one terminal, or there may be dozens of or hundreds of terminals or more. The embodiment of this application does not limit the quantity and device type of the terminals 220.

Figure 3:
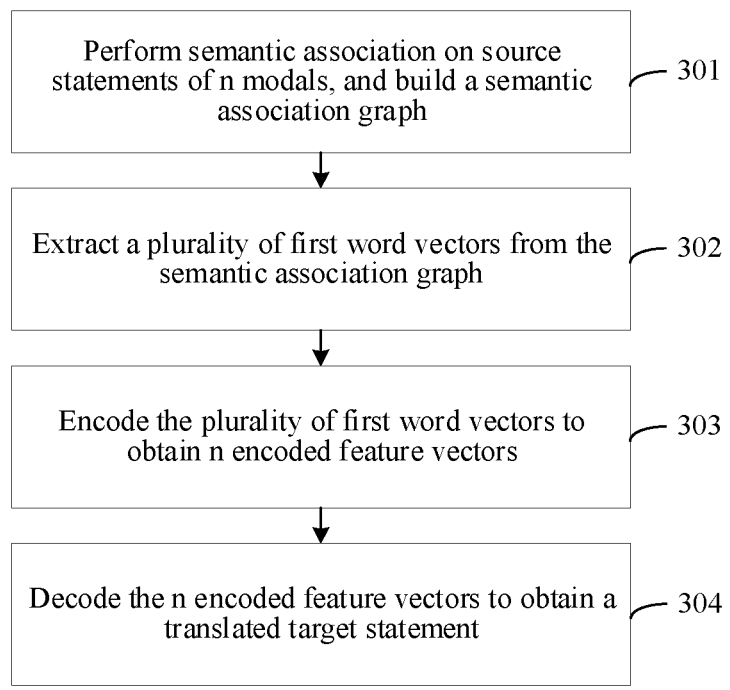
FIG. 3 is a flow chart of a translation method based on multimodal machine learning provided in one exemplary embodiment of this application.

Referring to FIG. 3, a flow chart of a translation method based on multimodal machine learning provided by an exemplary embodiment of this application is illustrated. The method is applied to the computer device shown in FIG. 2. The computer device includes a terminal or server. The method includes:

In Step 301, the computer device performs semantic association on source statements of n modals, and builds a semantic association graph.

The above semantic association graph includes semantic nodes of n different modals, a first connecting edge used for connecting the semantic nodes of a same modal, and a second connecting edge used for connecting the semantic nodes of different modals, and n being a positive integer greater than 1.

The source statement of one modal is taken as an example. The source statement corresponds to one group of semantic nodes, and the group of semantic nodes includes at least one semantic node used for representing a semantic unit in the source statement.

The computer device is provided with a multimodal fusion encoder and a decoder. The computer device extracts the semantic nodes from the source statement of each modal through a multimodal graph representation layer, and obtains n groups of semantic nodes corresponding to the source statements of then modals. By means of the multimodal graph representation layer, the first connecting edge is used to connect the semantic nodes in a same modal from among the n groups of semantic nodes, that is, the first connecting edge is added between any two semantic nodes of the same modal; and the second connecting edge is used to connect the semantic nodes of different modals from among the n groups of semantic nodes, that is, the second connecting edge is added between any two semantic nodes of different modals to obtain the semantic association graph.

In some embodiments, the source statements of the n modals include a text-form first source statement and a non-text-form second source statement, and the n groups of semantic nodes include a first semantic node and a second semantic node. The computer device extracts a first semantic node from the first source statement and extracts candidate semantic nodes from the second source statement through the multimodal graph representation layer; invoke the multimodal graph representation layer to calculate, according to a semantic association between the first semantic node and the candidate semantic nodes, a first probability distribution of the candidate semantic nodes; invoke the multimodal graph representation layer to determine, according to the first probability distribution, a second semantic node from the candidate semantic nodes.

For the extraction of the semantic nodes in the text-form first source statement, the computer device performs word segmentation processing on the first source statement to obtain m words after word segmentation, and the m words correspond to the first semantic node in the first source statement, m being a positive integer.

For the extraction of the semantic nodes in the non-text-form second source statement, the computer device extracts a target corresponding to the semantic of at least one word among the m words from the second source statement, and the target is a second semantic node in the second source statement.

Figure 4:
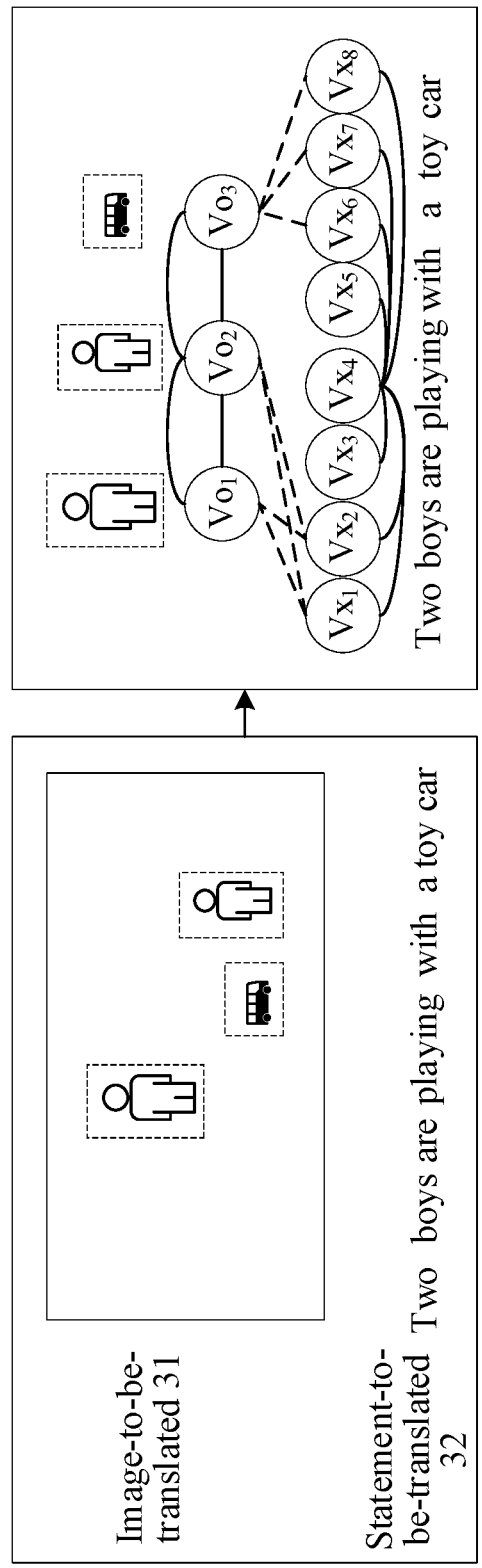
FIG. 4 is a flow chart of building a semantic association graph provided in one exemplary embodiment of this application.

Exemplarily, as shown in FIG. 4, the source statements of the two modals include an image-to-be-translated 31 and a statement-to-be-translated 32. The content of the statement-to-be-translated 32 includes "Two boys are playing with a toy car.", and each English word corresponds to one first semantic node, which are respectively Vx1, Vx2, Vx3, Vx4, Vx5, Vx6, Vx7, and Vx8. In some embodiments, Vx1, Vx2, Vx3, Vx4, Vx5, Vx6, Vx7, and Vx8 are also known as textual nodes. The computer device extracts, on the basis of the semantic of the semantic nodes, candidate images from the image-to-be-translated 31; calculates, according to a semantic association between the semantic nodes and the candidate images, a first probability distribution. The computer device determines, according to the first probability distribution, target image 1 and target image 2 corresponding to the semantic of Vx1 and Vx2 from the candidate images and target image 3 corresponding to the semantic of Vx6, Vx7, and Vx8. Vo1, Vo2 and Vo3, corresponding to target image 1 (e.g., first boy), target image 2 (e.g., second boy), and target image 3 (e.g., toy car), are three second semantic nodes in the image-to-be-translated 31. In some embodiments, Vo1, Vo2 and Vo3 are also known as visual nodes. The computer device uses the first connecting edge (e.g., the solid lines in FIG. 3) between every two of Vx1, Vx2, Vx3, Vx4, Vx5, Vx6, Vx7, and Vx8 for intra-modal semantic connection, uses the first connecting edge between every two of Vo1, Vo2, and Vo3 for intra-modal semantic connection, and uses the second connecting edge (e.g., the dotted lines in FIG. 3) between the first semantic node and the second semantic node for inter-modal semantic connection. Referring back to FIG. 1, we can observe that all visual nodes are connected to each other, and all textual nodes are fully connected. However, only nodes Vo1 and Vx1, Vo1 and Vx2, Vo2 and Vx1, Vo2 and Vx2, Vo3 and Vx6, Vo3 and Vx7, Vo3 and Vx8 are connected by inter-modal edges.

In some embodiments, different modals are correspondingly provided with different first connecting edges. During intra-modal connection for the semantic nodes, the computer device determines, through the multimodal graph presentation layer, an $i^{th}$ type of first connecting edge corresponding to an $i^{th}$ modal, and uses the $i^{th}$ type of first connecting edge to connect the semantic nodes in the same modal from among the $i^{th}$ group of semantic nodes, that is, the $i^{th}$ type of first connecting edge is added between any two semantic nodes in the $i^{th}$ group of semantic nodes, i being a positive integer less than or equal to n.

In some embodiments, the source statements of two modals are translated. In accordance with a determination that the source statements of the two modals are characters and images respectively, the computer device establishes a semantic association between the source statements of the two modals through a visual grounding tool to build a semantic association graph.

In Step 302, the computer device extracts a plurality of first word vectors from the semantic association graph.

Exemplarily, the computer device processes the semantic association graph by means of word embedding to obtain the plurality of first word vectors. Word embedding refers to mapping words to word vectors. In some embodiments, methods of word embedding include at least one of the following four steps:

word embedding is performed through a neural network model;

word embedding is performed by reducing the dimension of a word co-occurrence matrix;

word embedding is performed through a probabilistic model; and/or word embedding is performed on words on the basis of the semantic of the words in the context.

For example, words in the text-form source statement are represented by one-hot encoding, and then word embedding is performed by an embedding matrix.

In Step 303, the computer device encodes the plurality of first word vectors to obtain n encoded feature vectors.

The computer device performs intra-modal feature extraction on the first word vectors through a multimodal fusion encoder, and then performs inter-modal feature fusion on the vectors obtained by the feature extraction.

As an example, n has the value of 3. The multimodal fusion encoder includes a first feature extraction function corresponding to the first modal, a second feature extraction function corresponding to the second modal, and a third feature extraction function corresponding to the third modal. The computer device performs feature extraction in the first modal on the first word vectors through the first feature extraction function, performs feature extraction in the second modal on the first word vectors through the second feature extraction function, and performs feature extraction in the third modal on the first word vectors through the third feature extraction function, thus finally obtaining three hidden layer functions. The multimodal fusion encoder also includes a first feature fusion function corresponding to the first modal, a second feature fusion function corresponding to the second modal, and a third feature fusion function corresponding to the third modal. The computer device performs inter-modal feature fusion on the above three hidden layer functions through the first feature fusion function, performs inter-modal feature fusion on the above three hidden layer functions through the second feature fusion function, and performs inter-modal feature fusion on the above three hidden layer functions through the third feature fusion function, thus obtaining three hidden layer vectors after feature fusion, that is, the encoded feature vectors.

In Step 304, the computer device decodes the n encoded feature vectors to obtain a translated target statement.

The computer device invokes the decoder to decode the n encoded feature vectors to obtain the translated target statement. The target statement is a statement obtained by translating the source statements of the n modal into a specified language class.

To sum up, the translation method based on multimodal machine learning provided in this embodiment performs semantic association on the source statements of the n modals through the multimodal graph representation layer to build the semantic association graph, uses the first connecting edge to connect the semantic nodes of the same modal in the semantic association graph, and uses the second connecting edge to connect the semantic nodes of different modals; the semantic association between the source statements of multiple modals is fully represented by the semantic association graph, and then the multimodal fusion encoder performs full semantic fusion on the feature vectors in the semantic association graph to obtain the encoded feature vectors after encoding; after the encoded feature vector are decoded, a more accurate target statement is obtained. The target statement is closer to content, emotion, language environment, and the like comprehensively expressed in the multimodal source statements.

Figure 5:
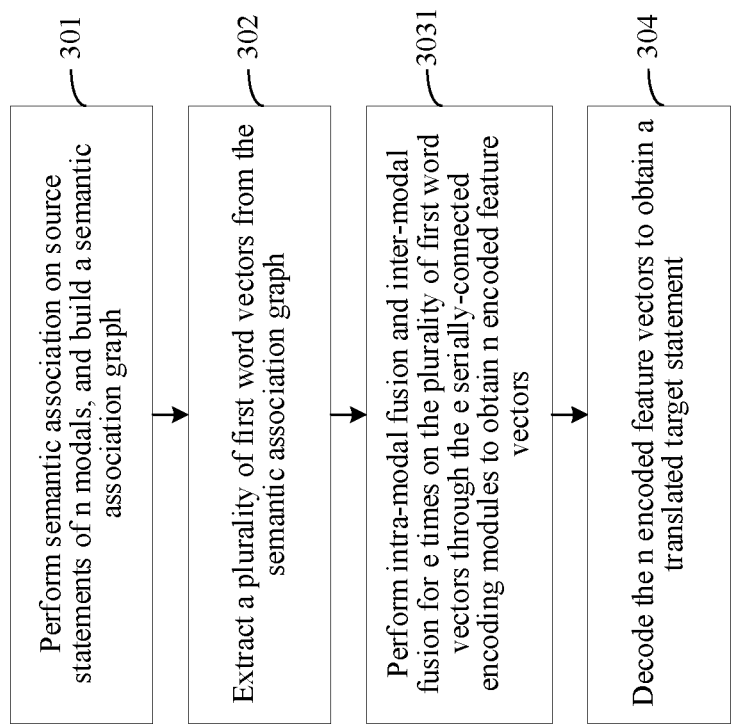
FIG. 5 is a flow chart of a translation method based on multimodal machine learning provided in another exemplary embodiment of this application.

Based on FIG. 3, the multimodal fusion encoder includes e serially-connected encoding modules. Each encoding module includes n intra-modal fusion layers and n inter-modal fusion layers corresponding to the n modals one to one, e being a positive integer. Therefore, step 303 may include step 3031. As shown in FIG. 5, the steps are as follows:

In Step 3031, the computer device performs intra-modal fusion and inter-modal fusion for e times on the plurality of first word vectors through the e serially-connected encoding modules to obtain n encoded feature vectors.

The intra-modal fusion means semantic fusion between the first word vectors in the same modal, and the inter-modal fusion means semantic fusion between the first word vectors of different modals.

Exemplarily, the intra-modal fusion and the inter-modal fusion of the above encoded feature vectors may be achieved by the following steps:

1) Input the first word vectors into the n intra-modal fusion layers in the first encoding module respectively, and perform semantic fusion in the same modal on the first word vectors through the n intra-modal fusion layers, respectively, to obtain n first hidden layer vectors, one first hidden layer vector corresponding to one modal, that is, obtain n first hidden layer vectors corresponding to the n modals one to one.

Exemplarily, the computer equipment inputs the first word vectors into the first intra-modal fusion layer in the first encoding module, and performs intra-modal semantic fusion on the first word vectors through the first intra-modal fusion layer to obtain first hidden layer vector 1; inputs the first word vectors into the second intra-modal fusion layer in the first encoding module, and performs intra-modal semantic fusion on the first word vectors through the second intra-modal fusion layer to obtain first hidden layer vector 2; . . . ; inputs the first word vectors into the nth intra-modal fusion layer in the first encoding module, and performs intra-modal semantic fusion on the first word vectors through the nth intra-modal fusion layer to obtain first hidden layer vector n;

A feature extraction function is set in the intra-modal fusion layer. In some embodiments, the feature extraction function includes a self-attention function. In some embodiments, different or same self-attention functions are set in different intra-modal fusion layers. The difference in the self-attention functions means that parameters in the functions are different. When the self-attention functions corresponding to different modals are different, the parameters in the functions corresponding to different modals are different.

2) Input the n first hidden layer vectors into each inter-modal fusion layer in the first encoding module, and perform semantic fusion between different modals on the n first hidden layer vectors through each inter-modal fusion layer to obtain n first intermediate vectors, one intermediate vector corresponding to one modal, that is, obtain n first intermediate vectors corresponding to the n modals one to one.

Exemplarily, the computer device inputs the n first hidden layer vectors into the first inter-modal fusion layer in the first encoding module, and performs inter-modal semantic fusion on the n first hidden layer vectors through the first inter-modal fusion layer to obtain first intermediate vector 1 corresponding to the first modal; inputs the n first hidden layer vectors into the second inter-modal fusion layer in the first encoding module, and performs inter-modal semantic fusion on the n first hidden layer vectors through the second inter-modal fusion layer to obtain first intermediate vector 2 corresponding to the second modal; . . . ; inputs the n first hidden layer vectors into the nth inter-modal fusion layer in the first encoding module, and performs inter-modal semantic fusion on the n first hidden layer vectors through the nth inter-modal fusion layer to obtain first intermediate vector n corresponding to the nth modal.

A feature fusion function is set in the inter-modal fusion layer. In some embodiments, the feature fusion functions set in different inter-modal fusion layers are different or the same. The difference of the feature fusion function means that parameters in the functions are different, or calculation methods of the functions are different.

In some embodiments, each encoding module further includes: n first vector transformation layers corresponding to the n modals one to one; after the n first intermediate vectors are obtained, the computer device further respectively inputs the n first intermediate vectors into the n first vector transformation layers corresponding to the modals to which the first intermediate vectors belong to perform nonlinear transformation, and obtains n first intermediate vectors after nonlinear transformation.

3) Input then first intermediate vectors into the $j^{th}$ encoding module for $j^{th}$ encoding processing until the last encoding module outputs n encoded feature vectors, one encoded feature vector corresponding to one modal, that is, until the last encoding module outputs n encoded feature vectors corresponding to the n modals one to one.

The computer equipment inputs the n intermediate vectors into the second encoding module for the second encoding processing to obtain n re-encoded first intermediate vectors; . . . ; inputs then re-encoded first inter-vector vectors into the $j^{th}$ encoding module for $j^{th}$ encoding processing to obtain n re-encoded first intermediate vectors; . . . ; inputs the n re-encoded first intermediate vectors into the eth encoding module for $e^{th}$ encoding processing to obtain n encoded feature vectors; j is a positive integer greater than 1 and less than or equal to e. In some embodiments, the hierarchical structure in each encoding module in the e serially connected encoding modules is the same, that is, the $j^{th}$ encoding module performs processing according to the steps for encoding the first intermediate vectors by the first encoding module until the last encoding module outputs the encoded feature vectors.

Exemplarily, in this embodiment, a self-attention mechanism is used for modeling semantic information inside the same modal, and the $j^{th}$ encoding module calculates the first hidden layer vector $C_x^{(j)}$ corresponding to a text statement, formula:

$$C_x^{(j)} = \text{MultiHead}(H_x^{(j-1)}, H_x^{(j-1)}, H_x^{(j-1)});$$

where $H_x^{(j-1)}$ refers to the first word vector corresponding to the text statement or the first intermediate vector output by the $(j-1)^{th}$ encoding module; x is used for identifying the semantic node of the text statement, and the vector calculated by the semantic node of the text statement; MultiHead (Q,K,V) is a multi-attention mechanism modeling function that takes a triple (Queries, Key, Values) as an input; Q is a query matrix; K is a key matrix; V is a value matrix, where Q, K, and V are calculated from $H_x^{(j-1)}$ and parameter vectors.

The $j^{th}$ multimodal fusion encoder calculates the first hidden layer vector $C_o^{(j)}$ corresponding to the image, formula:

$$C_o^{(j)} = \text{MultiHead}(H_o^{(j-1)}, H_o^{(j-1)}, H_o^{(j-1)});$$

where $H_o^{(j-1)}$ refers to the first word vector corresponding to the image or the first intermediate vector output by the $(j-1)^{th}$ encoding module.

In this embodiment, a gate mechanism-based cross-modal fusion mechanism is also used for modeling semantic fusion between multiple modals, and the jth encoding module calculates the first intermediate vector or encoded feature vector $M_{x_u}^{(j)}$ corresponding to the text statement, formula:

$$M_{x_u}^{(j)} = \sum_{s \in A(v_{x_u})} a_{u,s} \odot C_{o_s}^{(j)};$$

$$a_{u,s} = \text{Sigmoid}\ (W_1^{(j)} C_{x_u}^{(j)} + W_2^{(j)} C_{o_s}^{(j)});$$

where A represents a set; correspondingly, $A(x_{v_u})$ is a set of neighbor nodes of the first semantic node $v_{x_u}$ in the semantic association graph; $v_{x_u}$ represents the $u^{th}$ semantic node of the text statement, and u is a positive integer; Cos(j) is a semantic representation vector of the $s^{th}$ semantic node of the image in the $j^{th}$ encoding module; $C_{x_u}^{(j)}$ is the semantic representation vector of the $u^{th}$ semantic node of the text statement in the jth encoding module; $W_1^{(j)}$ and $W_2^{(j)}$ are parameter matrices; $\odot$ represents XOR operation; Sigmoid( ) is an s-curve function; o is used for identifying the semantic node of the image and the vector calculated by the semantic node of the image. The first intermediate vector or the encoded feature vector $M_{o_s}^{(j)}$ corresponding to the image is also calculated by the same calculation manner, which will not be repeated here.

After multimodal fusion, in this embodiment, a feedforward neural network (FFN) is also used for generating a final encoded feature vector. The encoded feature vector corresponding to the text statement and the encoded feature vector corresponding to the image are:

$$H_x^{(j)} = \text{FFN}(M_x^{(j)});$$

$$H_o^{(j)} = \text{FFN}(M_o^{(j)});$$

where $M_x^{(j)} = \{M_{x_u}^{(j)}\}$; $M_o^{(j)} = \{M_{o_s}^{(j)}\}$ { } represents a set; $M_{x_u}^{(j)}$ represents the encoded feature vector corresponding to the $u^{th}$ semantic node of the text statement in the $j^{th}$ encoding module; and $M_{o_s}^{(j)}$ is the encoded feature vector corresponding to the $s^{th}$ semantic node of the image in the $j^{th}$ encoding module vector.

To sum up, the translation method based on multimodal machine learning provided in this embodiment performs semantic association on the source languages of the n modals through the multimodal graph representation layer to build the semantic association graph, uses the first connecting edge to connect the semantic nodes of the same modal in the semantic association graph, and uses the second connecting edge to connect the semantic nodes of different modals; the semantic association between the source languages of multiple modals is fully represented by the semantic association graph, and then the multimodal fusion encoder performs full semantic fusion on the feature vectors in the semantic association graph to obtain the encoded feature vectors after encoding; after the encoded feature vector are decoded, a more accurate target statement is obtained. The target statement is closer to content, emotion, language environment, and the like comprehensively expressed in the multimodal source languages.

In the method, the multimodal fusion encoder includes e serially-connected encoding modules, and each encoding module includes an intra-modal fusion layer and an inter-model fusion layer. An encoded feature vector with more complete semantic fusion is obtained through multiple intra-modal and inter-modal alternative feature fusions, so that a more accurate target statement corresponding to the source languages of the n modals can be decoded.

Figure 6:
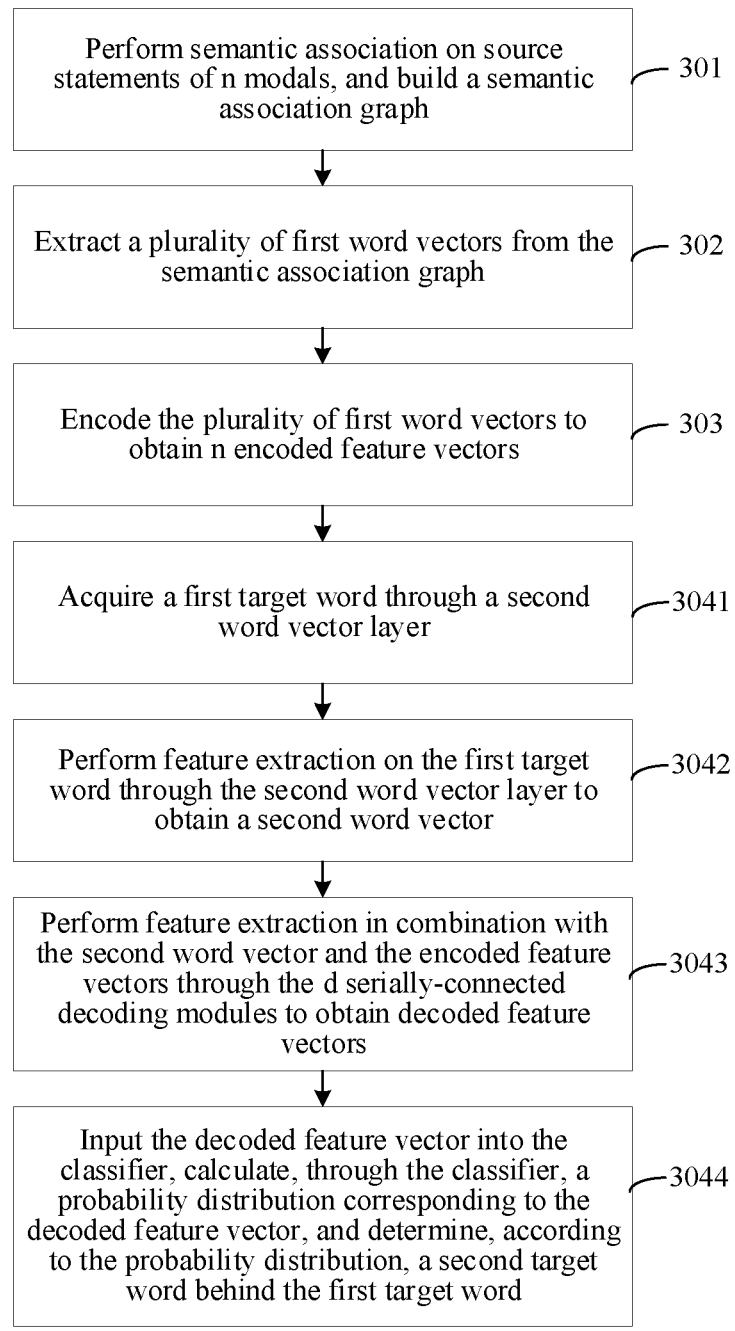
FIG. 6 is a flow chart of a translation method based on multimodal machine learning provided in another exemplary embodiment of this application.

Based on FIG. 3, the decoder also includes d serially-connected decoding modules; d is a positive integer; therefore, step 304 may include steps 3041 to 3044. As shown in FIG. 6, the steps are as follows:

In Step 3041, the computer device acquires a first target word through a second word vector layer.

The first target word is a translated word in the target statement. The computer device translates the words in the target statement one by one. After an $r^{th}$ word in the target statement is translated, the $r^{th}$ word is used as the first target word for translating an $(r+1)^{th}$ word. That is, the computer device inputs the $r^{th}$ word into the second word vector layer, r being a non-negative integer.

In Step 3042, the computer device performs feature extraction on the first target word through the second word vector layer to obtain a second word vector.

Exemplarily, the computer device performs word embedding on the first target word through the second word vector layer to obtain the second word vector. Word embedding is a technique for representing words in vector space as real vectors. In this embodiment, word embedding refers to mapping words into word vectors. For example, mapping "I" to obtain a word vector (0.1, 0.5, 5), and (0.1, 0.5, 5) is the word vector after word embedding for "I".

In Step 3043, the computer device performs feature extraction on the second word vector in combination with the encoded feature vector through the d serially-connected decoding modules to obtain decoded feature vectors.

The computer device invokes the d serially-connected decoding modules to process the encoded feature vectors and the second word vector on the basis of an attention mechanism, and extracts the decoded feature vectors.

In some embodiments, each of the d serially-connected decoding modules includes one first self-attention layer, one second self-attention layer and one second vector transformation layer. For the extraction of the decoded feature vectors, the computer equipment inputs the second word vector into the first self-attention layer in the first decoding module, and performs feature extraction on the second word vector through the first self-attention layer to obtain a second hidden layer vector; inputs the second hidden layer vector and the encoded feature vectors into the second self-attention layer in the first decoding module, and performs feature extraction in combination with the second hidden layer vector and the encoded feature vectors through the second self-attention layer to obtain a second intermediate vector; inputs the second intermediate vector into the kth decoding module for kth decoding processing until the last decoding module outputs the decoded feature vector, k being a positive integer greater than 1 and less than or equal to d.

The first self-attention layer is used for processing the second word vector on the basis of the self-attention mechanism to extract the second hidden layer vector. The second self-attention layer is used for processing the second hidden layer vector and the encoded feature vector by using the language class of the target statement on the basis of the attention mechanism to obtain the second intermediate vector. The first self-attention layer includes a first self-attention function; the second self-attention layer includes a second self-attention function; and parameters of the first self-attention function and the second self-attention function are different.

In some embodiments, each decoding module further includes: a second vector transformation layer. After the second intermediate vector is calculated, the computer device further inputs the second intermediate vector into the second vector transformation layer for nonlinear transformation to obtain a second intermediate vector after nonlinear transformation.

In Step 3044, the computer device inputs the decoded feature vector into the classifier, calculates, through the classifier, a probability distribution corresponding to the decoded feature vector, and determines, according to the probability distribution, a second target word behind the first target word.

In some embodiments, the classifier includes a softmax function. The computer device calculates the probability distribution corresponding to the decoded feature vector through the softmax function, and determines, according to the probability distribution corresponding to the decoded feature vector, the second target word behind the first target word.

To sum up, the translation method based on multimodal machine learning provided in this embodiment performs semantic association on the source languages of the n modals through the multimodal graph representation layer to build the semantic association graph, uses the first connecting edge to connect the semantic nodes of the same modal in the semantic association graph, and uses the second connecting edge to connect the semantic nodes of different modals; the semantic association between the source languages of multiple modals is fully represented by the semantic association graph, and then the multimodal fusion encoder performs full semantic fusion on the feature vectors in the semantic association graph to obtain the encoded feature vectors after encoding; after the encoded feature vector are decoded, a more accurate target statement is obtained. The target statement is closer to content, emotion, language environment, and the like comprehensively expressed in the multimodal source languages.

In the method, the language class of the target statement is used for repeatedly paying attention to the encoded feature vector and the second hidden layer vector through the d decoding modules to decode the target statement more accurately.

By comparing the multimodal machine translation model provided in this application with the previous multimodal neural machine translation (NMT), it can be clearly seen that the translation effect of the multimodal machine translation model provided in this application is the best. Exemplarily, two source languages, e.g., an image and a text, are taken as an example. The above test comparison is described in detail as follows:

The multimodal machine translation model provided in this application is built by an attention-based encoding and decoding framework, and log likelihood maximization of trained data is used as a target function. In essence, the multimodal fusion encoder provided in this application can be regarded as a multimodal enhanced graph neural network (GNN). In order to build the multimodal fusion encoder, the input image and text are correspondingly represented as one multimodal graph (e.g., a semantic association graph). Then, based on the above multimodal graph, multiple multimodal fusion layers are superimposed to learn node (e.g., semantic node) representation, so that attention-based context vectors are provided for the decoder.

I. For the building of the multimodal graph, the multimodal graph is undirected in form and can be formalized as G=(V, E). In a node set V, each node represents a text word or a visual object. The node corresponding to the text is referred to as a semantic node, and the node corresponding to the visual object is referred to as a visual node. The following policies are used for building the semantic association between the nodes:

1. Node Extraction:

(1) In order to make full use of text information, all words in the text are regarded as separate text nodes. For example, in FIG. 4, the multimodal graph includes a total of 8 text nodes, and each text node corresponds to one word in an input statement (that is, a statement-to-be-translated). (2) The Stanford parser is used for identifying all noun phrases in the input statement, and a visual grounding toolkit is then applied to identify corresponding bounding boxes (visual objects) of each noun phrase in an input image (i.e. an image-to-be-translated). After that, all the detected visual objects are regarded as independent visual nodes. For example, in FIG. 4, text nodes Vx1 and Vx2 correspond to visual nodes Vo1 and Vo2, and text nodes Vx6, Vx7 and Vx8 correspond to visual node Vo3.

2. In order to capture various semantic associations between multimodal semantic units, two kinds of edges (i.e. connecting edges) are used for connecting the semantic nodes. The two kinds of edges in edge set E include: (1) Any two semantic nodes in the same modal are connected by an intra-modal edge (the first connecting edge); (2) any text node and the corresponding visual node are connected by an inter-modal edge (the second connecting edge). Exemplarily, as shown in FIG. 4, the intra-modal edge (solid line) is used for connecting Vo1 to Vo2, and an inter-modal edge (solid line) is used for connecting Vo1 to Vx1.

II. For an embedding layer, a word embedding layer needs to be introduced to initialize node states before inputting the multimodal graph into the superimposed multimodal fusion layer. For each text node Vxu, its initial state Hxu defines a sum of word embedding and position embedding. For the initial state Hos of visual node Vos, it is necessary to extract visual features through a fully-connected layer of a region of interest (ROI) pooling layer in a Faster region-based convolutional neural network (R-CNN), and a rectified linear unit (ReLU) is then used as a multilayer perceptron of an activation function to project the visual features to a space that is the same as text representation.

R-CCN is rich feature hierarchies for accurate object detection and semantic segmentation.

Figure 7:
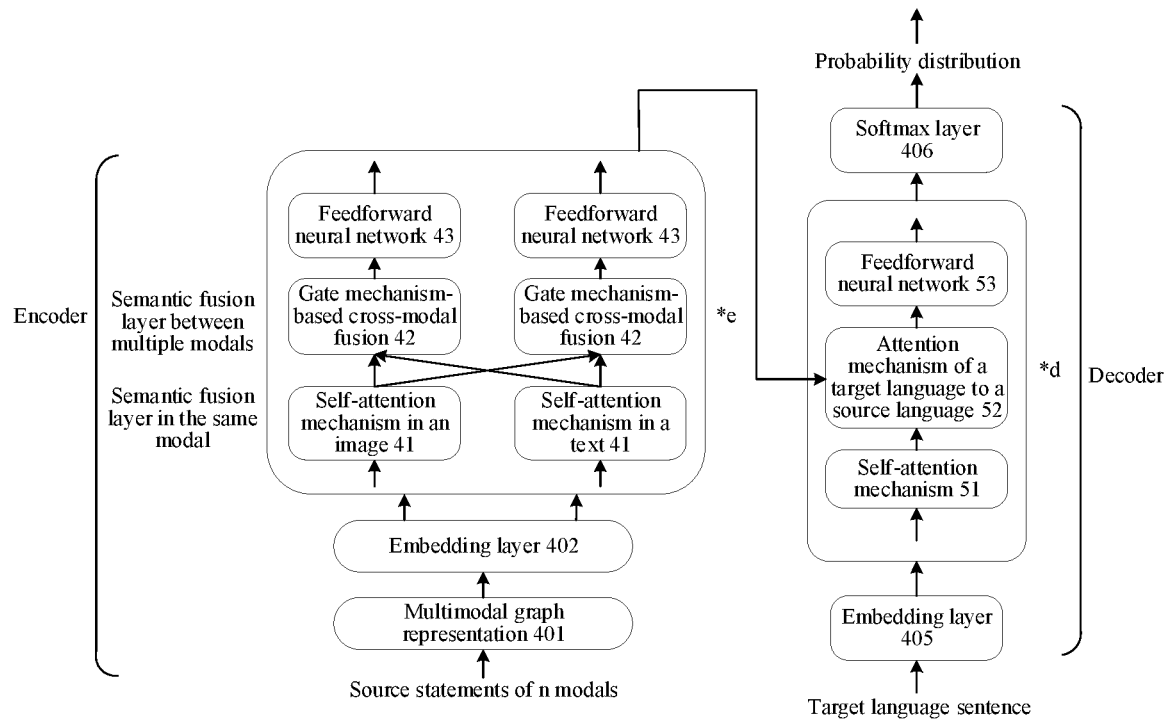
FIG. 7 is a schematic structural diagram of a multimodal machine translation model provided in another exemplary embodiment of this application.

III. As shown in FIG. 7, the encoder is shown in the left part; e layers of graph-based multimodal fusion layers are stacked on the top of the embedding layer 402, so as to encode the above multimodal graph. In the multimodal fusion layer, intra-modal fusion and inter-modal fusion are performed sequentially to update all the node states. In this way, the final node states encode both context information and cross-modal semantic information in the same modal. In particular, since the visual nodes and the text nodes are two kinds of semantic units containing different modal information, functions with similar operations but different parameters are adopted to model the state update process of the nodes.

Exemplarily, in j multimodal fusion layers, the update of text node states $H_x^{(j)}$ and visual node state $H_o^{(j)}$ mainly involves the following steps:

Step 1: Intra-modal fusion. In this step, information fusion between adjacent nodes in the same modality is performed using self-attention to generate a context representation of each node. Formally, a calculation formula of the context representation $C_x^{(j)}$ of all the text nodes is as follows:

$$C_x^{(j)} = \text{MultiHead}(H_x^{(j-1)}, H_x^{(j-1)}, H_x^{(j-1)});$$

where MultiHead (Q, K, V) is a multi-attention mechanism modeling function (also referred to as a multihead self-attention function), which takes the query matrix Q, the key matrix K and the value matrix V as inputs. Likewise, the calculation formula for the context representation $C_o^{(j)}$ of all the visual nodes is as follows:

$$C_o^{(j)} = \text{MultiHead}(H_o^{(j-1)}, H_o^{(j-1)}, H_o^{(j-1)})$$

In particular, since the initial state of the visual object is extracted by a deep learning algorithm (deep CNNs), a simplified multihead self-attention is applied to represent the initial state of the visual object, and an acquired linear item value and a final output are deleted.

Step 2: Inter-modal fusion. During feature fusion between the multiple modals, a cross-modal gate mechanism with an element operation characteristic is used for learning the semantic information of cross-modal neighborhood of each node. Specifically, the way to generate the state representation $M_{x_u}^{(j)}$ of the text node Vxu is as follows:

$$M_{x_u}^{(j)} = \sum_{s \in A(v_{x_u})} a_{u,s} \odot C_{o_s}^{(j)};$$

$$a_{u,s} = \text{Sigmoid}\left(W_1^{(j)} C_{x_u}^{(j)} + W_2^{(j)} C_{o_s}^{(j)}\right);$$

where $A(v_{x_u})$ is a set of neighbor nodes of the node Vxu in the multimodal graph; $W_1^{(j)}$ and $W_2^{(j)}$ are parameter matrices. Likewise, the way to generate the state representation $M_{o_s}^{(j)}$ of text node Vos is as follows:

$$M_{o_s}^{(j)} = \sum_{u \in A(v_{o_s})} \beta_{s,u} \odot C_{x_u}^{(j)};$$

$$\beta_{s,u} = \text{Sigmoid}\left(W_3^{(j)} C_{o_s}^{(j)} + W_4^{(j)} C_{x_u}^{(j)}\right);$$

where $A(v_{o_s})$ is a set of neighbor nodes of the node Vos in the multimodal graph; $W_3^{(j)}$ and $W_4^{(j)}$ are parameter matrices.

After the above multimodal fusion process, a feedforward neural network is used for generating a final Del hidden layer. The calculation process of the text node state $H_x^{(j)}$ and the image node state $H_o^{(j)}$ is:

$$H_x^{(j)} = \text{FFN}(M_x^{(j)});$$

$$H_o^{(j)} = \text{FFN}(M_o^{(j)});$$

where $M_x^{(j)} = \{M_{x_u}^{(j)}\}$; $M_o^{(j)} = \{M_{o_s}^{(j)}\}$ indicates that all the text node states and the image node states are updated.

IV. For the decoder, it is similar to a traditional transformer decoder. Since the visual information has been incorporated into all text nodes through the multiple graph-based multimodal fusion layers, the decoder is allowed to focus only on the text node state to dynamically use a multimodal context, i.e. to only input the text node state to the decoder.

As shown in the right part of FIG. 7, d identical layers are stacked to generate a target-side hidden state, each layer including three sub-layers. Specifically, the previous two sub-layers are masked self-attention Ej and encoder-decoder attention Tj, so as to integrate contexts of the target language side and the source language side:

$E^{(j)}=\text{MultiHead}(S^{j-1},S^{j-1},S^{j-1});$ $T^{(j)}=\text{MultiHead}(E^{(j)},H_x^{(e)},H_x^{(e)});$ where S(j−1) represents the target-side hidden state in a (j−1)$^{th}$ layer. In particular, S(0) is an embedding vector of an input target word, and $H_x^{Le}$ is a hidden state of the top layer in the decoder. Then, a fully-connected feedforward neural network in one position direction is used for generating S(j), and the formula is as follows:

$S^{(j)}=\text{FFN}(T^{(j)});$ finally, the probability distribution for generating the target statement is defined using the softmax layer, and this layer takes the hidden state $S_t^{Ld}$ of the top layer as an input:

$$P(Y\mid X,I)=\prod_t \text{Softmax}(WS_t^d+b);$$

where X is the input statement-to-be-translated; I is the input image-to-be-translated; Y is the target statement (i.e. a translated statement); and W and b are the parameters of the softmax layer.

During the experiment, translating English into French and German is used as a translation task, and a dataset is Multi30K dataset. Each image in the dataset corresponds to an English description, and human-translated German and French are paired. Training, validation, and test sets contain 29000, 1014, and 1000 instances, respectively. In addition, various models and fuzzy MSCOCO test sets on the WMT17 test set are estimated. They contain 1000 and 461 instances, respectively. In this experiment, preprocessed statements are directly used, and words are segmented into sub-words by byte pair encoding and 10000 merge operations.

Visual features: The Stanford parser is first used for identifying the noun phrases from each source statement, and the visual grounding toolkit is then used for detecting associated visual objects of the identified noun phrases. For each phrase, the prediction probability of the visual object corresponding to the phrase is kept highest, so as to reduce the negative impact of rich visual objects. In each sentence, the average numbers of objects and words are around 3.5 and 15.0, respectively. Finally, the 2048-dimensional features of these objects are calculated using the pre-trained ResNet-100 Faster RCNN.

Setting: A transformer is used as a basis. Due to a small training corpus, a trained model tends to be overfitted, and a small-range grid search is first performed to obtain a group of hyperparameters on an English-to-German validation set. Specifically, the word embedding dimension and hidden size are 128 and 256, respectively. The decoder includes 4 layers, and the number of attention heads is 4. The dropout rate is set to 0.5. Each batch is composed of approximately 2000 source code operators and target tokens. An Adam optimizer with a predetermined learning rate is used for optimizing the various models, and other identical settings are used. Finally, the quality of translations is assessed using the bilingual evaluation understudy (BLEU) indicator and a METEOR indicator. All models are run three times in each experiment, and an average result is reported.

Basic model: In addition to the text-based transformer (TF), visual features are also used, and several effective methods are used for transformation. The model provided in this embodiment of this application is compared with the transformer:

1. Object As Token (TF). It is a variant of the transformer. All visual objects are regarded as extra source code operators and placed in front of the input statement.
2. Enc-att (TF). An encoder-based image attention mechanism is used in the transformer, which adds each source annotation and an attention-based visual feature vector.
3. Doubly-att (TF). It is a dual-attention transformer. In each decoding layer, a cross-modal multihead attention sub-layer is inserted in front of a fully-connected feedforward layer to generate, on the basis of the visual features, a visual context vector.

Correspondingly, the performance of several major multimodal neural machine translation (NMT) models, such as Doubly-att (RNN), Soft-att (RNN), Stochastic-att (RNN), Fusion-cony (RNN), Trg-mul (RNN), VMM T (RNN) and Deliberation Network (TF) is further shown. RNN is a recurrent neural network.

Figure 8:
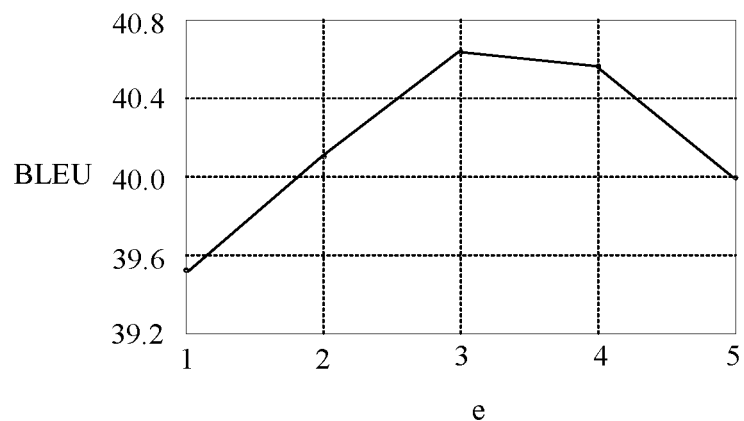
FIG. 8 is a graph of a model test result provided in one exemplary embodiment of this application.

The number e of the multimodal fusion layers is an important hyperparameter that directly determines the degree of fine-grained semantic fusion in the encoder. Therefore, its impact on the English-to-German validation set is first checked. FIG. 8 shows experimental results. In an example, when e is 3, the model achieves the best p shape. Therefore, e=3 is used in all subsequent experiments.

TABLE 1

| Model | Test 2016 BLEU | METEOR | Test 2017 BLEU | METEOR | MS OCO BLEU | METEOR |
|---|---|---|---|---|---|---|
| Related multimodal NMT system | | | | | | |
| Doubly-att (RNN) | 36.5 | 55.0 | — | — | — | — |
| Soft-att (RNN) | 37.6 | 55.3 | — | — | — | — |
| Stochastic-att (RNN) | 38.2 | 55.4 | — | — | — | — |
| Fusion-conv (RNN) | 37.0 | 57.0 | 29.8 | 51.2 | 25.1 | 46.0 |
| Trg-mul (RNN) | 37.8 | 57.7 | 30.7 | 52.2 | 26.4 | 47.4 |
| VMMT (RNN) | 37.7 | 56.0 | 30.1 | 49.9 | 25.5 | 44.8 |
| Deliberation Network (TF) | 38.0 | 55.6 | — | — | — | — |

TABLE 1-continued

|  | Test 2016 BLEU | METEOR | Test 2017 BLEU | METEOR | MS OCO BLEU | METEOR |
|---|---|---|---|---|---|---|
| Multimodal NMT system provided in this embodiment of this application | | | | | | |
| Transformer | 38.4 | 56.5 | 30.6 | 50.4 | 27.3 | 46.2 |
| Object As Token (TF) | 39.0 | 57.2 | 31.7 | 51.3 | 28.4 | 47.0 |
| Enc-att (TF) | 38.7 | 56.6 | 31.3 | 50.6 | 28.0 | 46.6 |
| Doubly-att (TF) | 38.8 | 56.8 | 31.4 | 50.5 | 27.4 | 46.5 |
| Model of this application | 39.8 | 57.6 | 32.2 | 51.9 | 28.7 | 47.6 |

Table 1 shows main results of the English-to-German task. By comparing with Fusion-conv (RNN) and Trg-mul (RNN) on METEOR, the performance of the model provided in this embodiment of this application is better than that of most of the previous models. Two groups of results depend on the system state on the WMT2017 test set, and the WMT2017 test set is selected on the basis of METEOR. By comparison with a basic model, the following conclusions can be drawn.

First, the model provided in this embodiment of this application is better than Object As Token (TF). This model connects regional visual features with texts to form an attentionable sequence, and a self-attention mechanism is used for multimodal fusion. The basic reasons include two aspects: The first is to model a semantic correspondence relationship between the semantic units of different modals, and the other one is to distinguish the parameters of the models of different modals.

Second, the model provided in this embodiment of this application is also significantly better than Enc-att (TF). Enc-att (TF) can be considered as a single-layer semantic fusion encoder. In addition to the advantages of semantic correspondence relationship modeling, it is also conjectured that multilayer multimodal semantic interaction is also beneficial for the NMT.

Third, compared with Double-att (TF) which simply uses an attention mechanism to extract visual information, the model provided in this embodiment of this application achieves significant improvement due to the sufficient multimodal fusion provided in the encoder.

Figure 9:
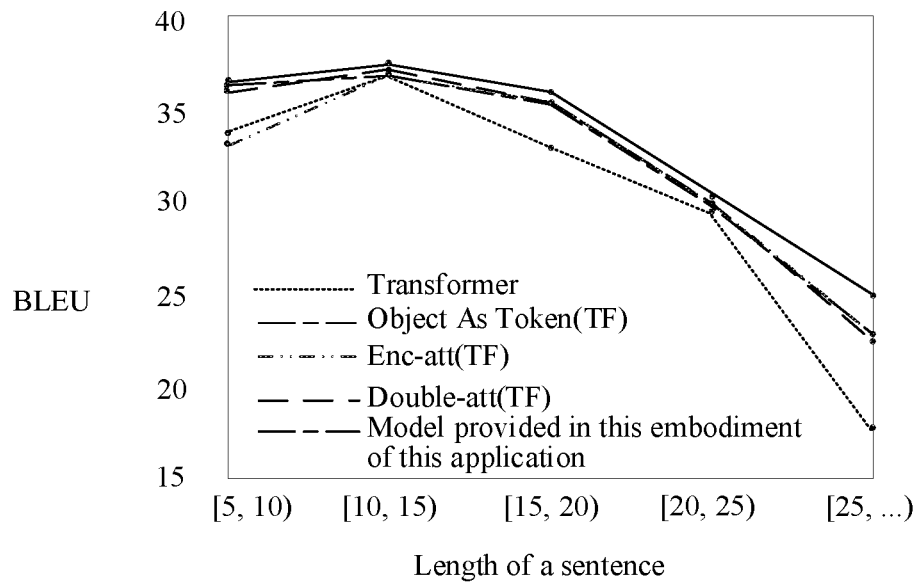
FIG. 9 is a graph of a model test result provided in another exemplary embodiment of this application.
Figure 10:
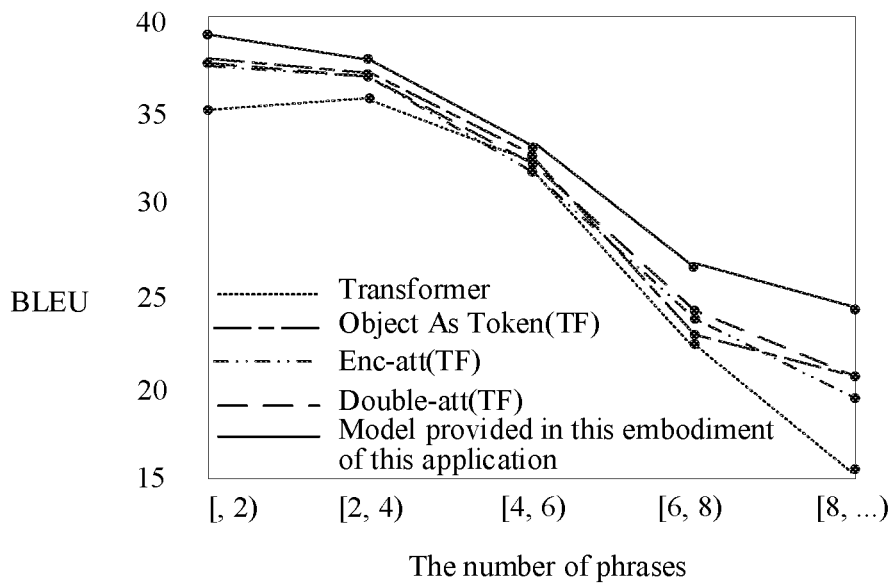
FIG. 10 is a graph of a model test result provided in another exemplary embodiment of this application.

In addition, the test set is divided into different groups according to the length of the source statement and the number of the noun phrases, and the performance of different models under each group of test sets is compared. FIG. 9 and FIG. 10 show BLEU scores for the above groups. In general, the model provided in this embodiment of this application still consistently achieve the best performance in all the groups. Therefore, the validity and generality of the models provided by this embodiment of this application are confirmed again. A sentence with many phrases is usually a long sentence. The improvement on the model provided in this embodiment of this application relative to the basic model is more meaningful. It is speculated that a long sentence often contains more ambiguous words. Therefore, compared with a short sentence, the long sentence may need to better utilize visual information as supplementary information, which can be achieved through the multimodal semantic interaction of the model provided in this embodiment of this application.

Further, Table 4 also shows training and decoding speeds of the model provided in this embodiment of this application and the basic model. During the training, the model provided in this embodiment of this application can process about 1.1 K tokens per second, which is comparable to other multimodal models. When a decoding process is executed, the model provided in this embodiment of this application translates about 16.7 sentences per second, and a slight decrease in speed compared to the transformer occurs. In addition, the model provided in this embodiment of this application only introduces a small number of additional parameters, and better performance is achieved.

TABLE 2

| | English-to-German | | | | | |
|---|---|---|---|---|---|---|
| | Test 2016 | | Test 2017 | | MS COCO | |
| | BLEU | METEOR | BLEU | METEOR | BLEU | METEOR |
| Model provided in this embodiment of this application | 39.8 | 57.6 | 32.2 | 51.9 | 28.7 | 47.6 |
| Inter-modal fusion | 38.7 | 56.7 | 30.7 | 50.6 | 27.0 | 46.7 |
| Visual grounding to full connection | 36.4 | 53.4 | 28.3 | 47.0 | 24.4 | 42.9 |
| Different parameters to uniform parameters | 39.2 | 57.3 | 31.9 | 51.4 | 27.7 | 47.4 |
| Attention to visual nodes | 39.6 | 57.3 | 32.0 | 51.3 | 27.9 | 46.8 |
| Attention to text node and attention to visual node | 30.9 | 48.6 | 22.3 | 41.5 | 20.4 | 38.7 |

TABLE 3

| Model | Test 2016 BLEU | METEOR | Test 2017 BLEU | METEOR |
|---|---|---|---|---|
| Existing multimodal NMT system | | | | |
| Fusion-conv (RNN) | 53.5 | 70.4 | 51.6 | 68.6 |
| Trg-mul (RNN) | 54.7 | 71.3 | 52.7 | 69.5 |
| Deliberation Network (TF) | 59.8 | 74.4 | — | — |
| Multimodal NMT system provided in this embodiment of this application | | | | |
| Transformer | 59.5 | 73.7 | 52.0 | 68.0 |
| Object As Token (TF) | 60.0 | 74.3 | 52.9 | 68.6 |
| Enc-att (TF) | 60.0 | 74.3 | 52.8 | 68.3 |
| Doubly-att (TF) | 59.9 | 74.1 | 52.4 | 68.1 |
| Model of this application | 60.9 | 74.9 | 53.9 | 69.3 |

In order to research the validities of different components, an experiment is further carried out. The model provided in this embodiment of this application is compared with the following variants in Table 2:

(1) Inter-modal fusion. In this variant, two independent transformer encoders are respectively used for learning semantic representations of the words and the visual objects, and a dual-attention decoder is then used for merging a text and a visual context into the decoder. The result on line 3 in Table 2 shows that a significant performance decrease will be caused without the inter-modal fusion. This shows that the semantic interaction between the multimodal semantic units is helpful for the learning of the multimodal representation in deed.

(2) Visual grounding to full connection. The words and the visual objects are fully connected to build an inter-modal correspondence relationship. The result on line 4 in Table 2 shows that this change causes a significant performance decrease. The primary cause is that the fully-connected semantic correspondingly brings large noise to the model provided in this embodiment of this application.

(3) Different parameters to uniform parameters. During constructing this variant, the uniform parameters are allocated to update the node states under different modes. Obviously, the performance decrease reported on line 5 in Table 2 also proves the validity of the method using different parameters.

(4) Attention to visual nodes. Unlike the model that only considers the text nodes, the decoder that allows this variant uses a dual-attention decoder to consider both types of nodes. It can be observed from the results on line 6 in Table 2 that considering all the nodes does not bring a further improvement. The above results prove the previous hypothesis that the visual information is fully incorporated into the text nodes in the encoder.

(5) Attention to text nodes and attention to visual nodes. However, when only the visual nodes are considered, the performance of the model drops sharply, as shown in line 7 in Table 2. This is because there are far fewer visual nodes than text nodes, so that the text nodes cannot generate enough translation contexts.

Exemplarily, experiments are also carried out on an English-French translation dataset. According to Table 3, compared with all the previous models, the model provided in this embodiment of this application still achieves better performance, which again proves that the model provided in this embodiment of this application is valid and general for different languages in the multimodal NMT.

In Table 2, compared with the machine translation model provided in the related multimodal NMT system, it can be clearly seen through the BLEU and METEOR indicators that the machine translation model in the multimodal NMT system provided in this embodiment of this application has also achieved a better effect on the translation between English and French, and three of the four indicator values are the highest values (bold numbers).

TABLE 4

| Model | Test (the number of tokens processed per second) | Decode (unit: the number of sentences processed per second) | Parameter |
|---|---|---|---|
| Transformer | 2.6K | 17.8 | 3.4K |
| Object As Token (TF) | 1.6K | 17.2 | 3.7K |
| Enc-att(TF) | 1.3K | 16.9 | 3.6K |
| Doubly-att(TF) | 1.0K | 12.9 | 3.8K |
| Model provided in this embodiment of this application | 1.1K | 16.7 | 4.0K |

Figure 11:
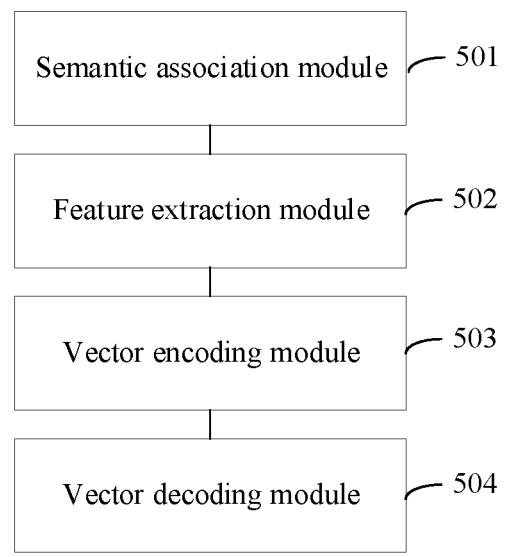
FIG. 11 is a block diagram of a translation apparatus based on multimodal machine learning provided in one exemplary embodiment of this application.

Referring to FIG. 11, a translation apparatus based on multimodal machine learning provided in one exemplary embodiment of this application is illustrated. The apparatus becomes part or all of a computer device through software, hardware, or a combination of hardware and software.

In some embodiments, the apparatus includes a semantic association module 501 configured to acquire, on the basis of n source statements belonging to different modals, a semantic association graph, the semantic association graph comprising n semantic nodes of different modals, a first connecting edge used for connecting the semantic nodes of a same modal, and a second connecting edge used for connecting the semantic nodes of different modals, the semantic nodes being used for expressing one semantic unit of the source statements under one modal, and n being a positive integer greater than 1;

In some embodiments, the semantic association module 501 is configured to semantically associate, through a multimodal graph representation layer, source languages of n modals to build a semantic association graph, the semantic association graph including semantic nodes of n different modals, a first connecting edge used for connecting the semantic nodes of a same modal, and a second connecting edge used for connecting the semantic nodes of different modals, and n being a positive integer greater than 1;

In some embodiments, the apparatus includes a feature extraction module 502 configured to extract a plurality of first word vectors from the semantic association graph, and/or extract the plurality of first word vectors from the semantic association graph through a first word vector layer;

In some embodiments, the apparatus includes a vector encoding module 503 configured to encode the plurality of first word vectors to obtain n encoded feature vectors and/or encode, through a multimodal fusion encoder, the plurality of first word vectors to obtain n encoded feature vectors;

In some embodiments, the apparatus includes a vector decoding module 504 configured to decode the n encoded feature vectors to obtain a translated target statement. In some embodiments, the vector decoding module 504 is configured to invoke a decoder to decode the n encoded feature vectors to obtain a translated target statement.

In some embodiments, the semantic association module 501 is configured to acquire n groups of semantic nodes, one group of semantic nodes corresponding to a source statement of one modal; add a first connecting edge between any two semantic nodes in the same modal, and add a second connecting edge between any two semantic nodes of different modals, so as to obtain the semantic association graph. In some embodiments, the semantic association module 501 is configured to extract semantic nodes from the source language of each modal to obtain n groups of semantic nodes corresponding to the source languages of the n modals; through the multimodal graph representation layer, connect the semantic nodes in the same modal from among the n groups of semantic nodes by using the first connecting edge, and connect the semantic nodes in different modals from among the n groups of semantic nodes by using the second connecting edge, so as to obtain the semantic association graph.

In some embodiments, the source languages of the n modals include a text-form first source language and a non-text-form second source language, and the n groups of semantic nodes include a first semantic node and a second semantic node.

The semantic association module 501 is configured to acquire the first semantic node, the first semantic node being obtained by processing, through the multimodal graph representation layer, the first source statement; acquire candidate semantic nodes, the candidate semantic nodes being obtained by processing, through the multimodal graph representation layer, the second source statement; acquire a first probability distribution of the candidate semantic nodes, the first probability distribution being calculated through the multimodal graph representation layer according to a semantic association between the first semantic node and the candidate semantic nodes; determine the second semantic node from among the candidate semantic nodes, the second semantic node being determined by the multimodal graph representation layer according to the first probability distribution.

In some embodiments, the semantic association module 501 is configured to extract a first semantic node from the first source statement, and extract candidate semantic nodes from the second source language through the multimodal graph representation layer; invoke the multimodal graph representation layer to calculate, according to a semantic association between the first semantic node and the candidate semantic nodes, a first probability distribution of the candidate semantic nodes; invoke the multimodal graph representation layer to determine, according to the first probability distribution, a second semantic node from the candidate semantic nodes.

In some embodiments, the semantic association module 501 is configured to add an $i^{th}$ type of first connecting edge between any two semantic nodes in the same modal from among an $i^{th}$ group of semantic nodes, the $i^{th}$ type of first connecting edge corresponding to an $i^{th}$ modal, and i being a positive integer less than or equal to n.

In some embodiments, the semantic association module 501 is configured to determine, through the multimodal graph representation layer, the $i^{th}$ type of first connecting edge corresponding to the $i^{th}$ modal, and the $i^{th}$ type of first connecting edge is used for connecting the semantic nodes in the same modal from among the $i^{th}$ group of semantic nodes, i being a positive integer less than or equal to n.

In some embodiments, the vector encoding module 503 is configured to perform intra-modal fusion and inter-modal fusion on the plurality of first word vectors for e times to obtain the n encoded feature vectors. The intra-modal fusion refers to semantic fusion between the first word vectors of the same modal, and the inter-modal fusion refers to semantic fusion between the first word vectors of different modals, e being a positive integer.

In some embodiments, the multimodal fusion encoder includes e serially-connected encoding modules, e being a positive integer.

The vector encoding module 503 is configured to perform intra-modal fusion and inter-modal fusion on the first word vectors for e times through the e serially-connected modules to obtain the encoded feature vector. The intra-modal fusion refers to semantic fusion between the first word vectors of the same modal, and the inter-modal fusion refers to semantic fusion between the first word vectors of different modals.

In some embodiments, each encoding module includes n intra-modal fusion layers and n inter-modal fusion layers corresponding to the n modals one to one.

The vector encoding module 503 is configured to input the first word vectors into the n intra-modal fusion layers in the first encoding module respectively, and perform semantic fusion in the same modal on the first word vectors through the n intra-modal fusion layers, respectively, to obtain n first hidden layer vectors, one first hidden layer vector corresponding to one modal, that is, obtain n first hidden layer vectors corresponding to the n modals one to one;

input the n first hidden layer vectors into each inter-modal fusion layer in the first encoding module, and perform semantic fusion between different modals on the n first hidden layer vectors through each inter-modal fusion layer to obtain n first intermediate vectors, one intermediate vector corresponding to one modal, that is, obtain n first intermediate vectors corresponding to the n modals one to one;

input the n first intermediate vectors into a $j^{th}$ encoding module for $i^{th}$ encoding processing until the last encoding module outputs n encoded feature vectors, one encoded feature vector corresponding to one modal, that is, until the last encoding module outputs n encoded feature vectors corresponding to the n modals one to one, and j being a positive integer greater than 1 and less than or equal to e.

In some embodiments, each encoding module further includes: n first vector transformation layers. One vector transformation layer corresponds to one modal, that is, n first vector transformation layers corresponding to the n modals one to one.

The vector encoding module 503 is further configured to input the n first intermediate vectors into the n first vector transformation layers corresponding to the modals to which the first intermediate vectors belong to perform nonlinear transformation, and obtain n first intermediate vectors after nonlinear transformation.

In some embodiments, the hierarchical structure in each encoding module of the e serially-connected encoding modules is the same.

In some embodiments, different or same self-attention functions are set in different intra-modal fusion layers, and different or same feature fusion functions are set in different inter-modal fusion layers.

In some embodiments, the vector decoding module 504 is configured to perform feature extraction on the first target word to obtain a second word vector, the first target word being a translated word in the target statement; perform feature extraction on the second word vector in combination with the encoded feature vectors to obtain decoded feature vectors; determine a probability distribution corresponding to the decoded feature vectors, and determine, according to the probability distribution, a second target word behind the first target word.

In some embodiments, the decoder includes d serially-connected decoding modules, d being a positive integer.

The vector decoding module 504 is configured to acquire a first target word through the second word vector, the first target word being a translated word in the target statement; perform feature extraction on the first target word through the second word vector layer to obtain a second word vector;

perform feature extraction on the second word vector in combination with the encoded feature vectors through the d serially-connected decoding modules to obtain decoded feature vectors; input the decoded feature vector into the classifier, calculate, through the classifier, a probability distribution corresponding to the decoded feature vector, and determine, according to the probability distribution, a second target word behind the first target word.

In some embodiments, each decoding module of the d serially-connected decoding modules includes a first self-attention layer and a second self-attention layer.

The vector decoding module 504 is configured to input the second word vector into the first self-attention layer in the first decoding module, and perform feature extraction on the second word vector through the first self-attention layer to obtain a second hidden layer vector;

input the second hidden layer vector and the encoded feature vectors into the second self-attention layer in the first decoding module, and perform feature extraction in combination with the second hidden layer vector and the encoded feature vectors through the second self-attention layer to obtain a second intermediate vector;

input the second intermediate vector into the kth decoding module for kth decoding processing until the last decoding module outputs the decoded feature vector, k being a positive integer greater than 1 and less than or equal to d.

In some embodiments, each decoding module further includes: a second vector transformation layer.

The vector decoding module 504 is further configured to input the second intermediate vector into the second vector transformation layer for nonlinear transformation to obtain a second intermediate vector after nonlinear transformation.

To sum up, the translation apparatus based on multimodal machine learning provided in this embodiment performs semantic association on the source languages of the n modals through the multimodal graph representation layer to build the semantic association graph, uses the first connecting edge to connect the semantic nodes of the same modal in the semantic association graph, and uses the second connecting edge to connect the semantic nodes of different modals; the semantic association between the source languages of multiple modals is fully represented by the semantic association graph, and then the multimodal fusion encoder performs full semantic fusion on the feature vectors in the semantic association graph to obtain the encoded feature vectors after encoding; after the encoded feature vector are decoded, a more accurate target statement is obtained. The target statement is closer to content, emotion, language environment, and the like comprehensively expressed in the multimodal source languages.

Figure 12:
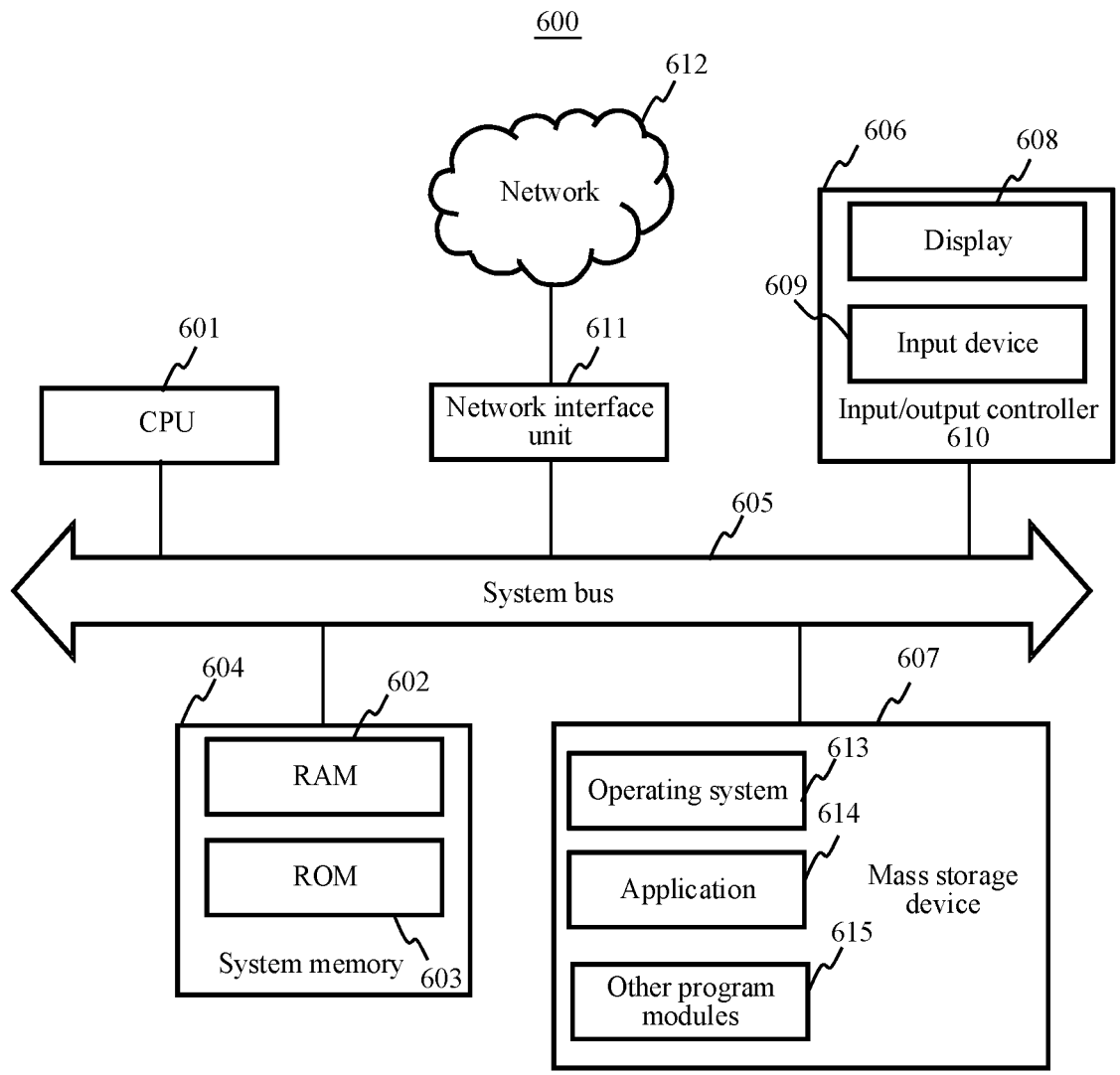
FIG. 12 is a schematic structural diagram of a server provided by an exemplary embodiment of this application.

Referring to FIG. 12, a schematic structural diagram of a server provided by an exemplary embodiment of this application is illustrated. The server is configured to implement the steps of the translation method based on multimodal machine learning provided in the above embodiments. Specifically:

The server 600 includes a central processing unit (CPU) 601, a system memory 604 including a random access memory (RAM) 602 and a read-only memory (ROM) 603, and a system bus 605 for connecting the system memory 604 to the CPU 601. The server 600 also includes a basic input/output (I/O) system 606 that helps transfer information between various devices in a computer, and a mass storage device 607 used for storing an operating system 613, an application 614 and other program modules 615.

The basic I/O system 606 includes a display 608 used for displaying information and an input device 609 such as a mouse, keyboard, etc., for user to enter information. The display 608 and the input device 609 are both connected to the CPU 601 through an I/O controller 610 connected to the system bus 605. The basic I/O system 606 may also include the I/O controller 610 used for receiving and processing inputs from a number of other devices such as a keyboard, mouse, or electronic stylus. Similarly, the I/O controller 610 also provides outputs to a display screen, a printer, or other types of output devices.

The mass storage device 607 is connected to the CPU 601 through a mass storage controller (not shown) connected to the system bus 605. The mass storage device 607 and its associated computer-readable media provide non-volatile storage for the server 600. That is, the mass storage device 607 may include a non-transitory computer-readable medium (not shown) such as a hard disk or a compact disc read-only memory (CD-ROM) drive.

In general, the non-transitory computer-readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, it is known to a person skilled in the art that the computer storage medium is not limited to the foregoing types. The system memory 604 and the mass storage device 607 described above may be collectively referred to as memory.

According to various embodiments of this application, the server 600 may also be run by a remote computer connected to a network through a network such as the Internet. That is, the server 600 can be connected to a network 612 through a network interface unit 611 connected to the system bus 605, or can also be connected to other types of networks or a remote computer system (not shown) through the network interface unit 611.

In the exemplary embodiments, a non-transitory computer-readable storage medium is further provided, such as a memory 602 including an instruction. The above instruction, when executed by a processor 601 of the server 600, may implement the translation method based on multimodal machine learning. In some embodiments, the computer-readable storage medium may be a non-transitory storage medium, for example, the non-transitory storage medium may be a ROM, a RAM, a CD-ROM, a magnetic tape, a floppy disk, an optical data storage device, and the like.

In an exemplary embodiment, a computer program product is also provided, including a computer program, which can be executed by a processor of an electronic device to implement the translation method based on multimodal machine learning.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs translation and/or machine learning. In practical application, the foregoing functions may be allocated to and completed by different functional modules according to requirements, that is, an inner structure of a device is divided into different functional modules to implement all or a part of the functions described above.

What is claimed is:

1. A translation method based on multimodal machine learning, executed by a computer device, the method comprising:
   acquiring a semantic association graph associated with n source statements belonging to different modals, the semantic association graph comprising:
   n semantic nodes of the different modals;
   a first connecting edge used for connecting the semantic nodes of a same modal; and
   a second connecting edge used for connecting the semantic nodes of different modals,
   wherein the semantic nodes are used for expressing one semantic unit of the source statement under one modal, and n is a positive integer greater than 1;
   extracting a plurality of first word vectors from the semantic association graph;
   encoding the plurality of first word vectors to obtain n encoded feature vectors; and
   decoding the n encoded feature vectors to obtain a translated target statement.

2. The method according to claim 1, wherein acquiring the semantic association graph comprises:
   acquiring n groups of semantic nodes, one group of semantic nodes corresponding to a source statement of one modal;
   adding a first connecting edge between any two semantic nodes in the same modal; and
   adding a second connecting edge between any two semantic nodes of different modals, so as to obtain the semantic association graph.

3. The method according to claim 2, wherein:
   the source statements of the n modals comprise a text-form first source statement and a non-text-form second source statement;
   the n groups of semantic nodes comprise a first semantic node and a second semantic node; and
   acquiring the n groups of semantic nodes comprises:
      acquiring the first semantic node by processing the first source statement using a multimodal graph representation layer;
      acquiring candidate semantic nodes by processing the second source statement using the multimodal graph representation layer;
      acquiring a first probability distribution of the candidate semantic nodes, the first probability distribution being calculated through the multimodal graph representation layer according to a semantic association between the first semantic node and the candidate semantic nodes; and
      determining the second semantic node from among the candidate semantic nodes, the second semantic node being determined by the multimodal graph representation layer according to the first probability distribution.

4. The method according to claim 2, wherein adding the first connecting edge between any two semantic nodes of the same modal comprises:
   adding an $i^{th}$ type of first connecting edge between any two semantic nodes in the same modal from among an $i^{th}$ group of semantic nodes, the $i^{th}$ type of first connecting edge corresponding to an $i^{th}$ modal, and i being a positive integer less than or equal to n.

5. The method according to claim 1, wherein:
   the encoding the plurality of first word vectors to obtain the n encoded feature vectors is performed using a multimodal fusion encoder, including:
   performing intra-modal fusion and inter-modal fusion on the plurality of first word vectors for e times to obtain the n encoded feature vectors, wherein the intra-modal fusion refers to semantic fusion between the first word vectors of the same modal, and the inter-modal fusion refers to semantic fusion between the first word vectors of different modals, e being a positive integer.

6. The method according to claim 5, wherein:
   the multimodal fusion encoder comprises e serially-connected encoding modules;
   each encoding module comprises n intra-modal fusion layers and n inter-modal fusion layers corresponding to the n modals one to one;
   performing the intra-modal fusion and the inter-modal fusion on the plurality of first word vectors for e times to obtain the n encoded feature vectors comprises:

inputting the plurality of first word vectors into the n intra-modal fusion layers in the first encoding module respectively, and performing semantic fusion in the same modal on the plurality of first word vectors through the n intra-modal fusion layers, respectively, to obtain n first hidden layer vectors, one first hidden layer vector corresponding to one modal;

inputting the n first hidden layer vectors into each inter-modal fusion layer in the first encoding module, and performing semantic fusion between different modals on the n first hidden layer vectors through each inter-modal fusion layer to obtain n first intermediate vectors, one intermediate vector corresponding to one modal; and inputting the n first intermediate vectors into a jth encoding module for jth encoding processing until the last encoding module outputs n encoded feature vectors, one encoded feature vector corresponding to one modal, j being a positive integer greater than 1 and less than or equal to e.

7. The method according to claim 6, wherein each of the encoding modules further comprises: n first vector transformation layers, one vector transformation layer corresponding to one modal; the method further comprises:

inputting the n first intermediate vectors into the n first vector transformation layers corresponding to the modals to which the first intermediate vectors belong to perform nonlinear transformation, and obtaining n first intermediate vectors after nonlinear transformation.

8. The method according to claim 6, wherein each of the encoding modules has a same hierarchical structure.

9. The method according to claim 6, wherein:

different intra-modal fusion layers comprise different self-attention functions; and different inter-modal fusion layers comprise different feature fusion functions.

10. The method according to claim 6, wherein:

different intra-modal fusion layers comprise identical self-attention functions; and different inter-modal fusion layers comprise identical feature fusion functions.

11. The method according to claim 1, wherein decoding the n encoded feature vectors to obtain the translated target statement comprises:

performing feature extraction on the first target word to obtain a second word vector, the first target word being a translated word in the target statement;

performing feature extraction on the second word vector in combination with the encoded feature vectors to obtain decoded feature vectors; and determining a probability distribution corresponding to the decoded feature vectors, and determining, according to the probability distribution, a second target word behind the first target word.

12. The method according to claim 11, wherein the decoder comprises d serially-connected decoding modules, d being a positive integer; each decoding module in the d serially-connected decoding modules comprises a first self-attention layer and a second self-attention layer;

the performing feature extraction on the second word vector in combination with the encoded feature vectors to obtain decoded feature vectors comprises:

inputting the second word vector into the first self-attention layer in the first decoding module, and performing feature extraction on the second word vector through the first self-attention layer to obtain a second hidden layer vector;

inputting the second hidden layer vector and the encoded feature vectors into the second self-attention layer in the first decoding module, and performing feature extraction in combination with the second hidden layer vector and the encoded feature vectors through the second self-attention layer to obtain a second intermediate vector; and inputting the second intermediate vector into a kth decoding module for kth decoding processing until the last decoding module outputs the decoded feature vector, k being a positive integer greater than 1 and less than or equal to d.

13. The method according to claim 12, wherein each decoding module further comprises a second vector transformation layer; the method further comprises:

inputting the second intermediate vector into the second vector transformation layer for nonlinear transformation to obtain a second intermediate vector after nonlinear transformation.

14. A computer device, comprising:

one or more processors; and memory storing one or more programs, the one or more programs comprising instructions that, when executed by the one or more processors, cause the one or more processors to perform operations comprising:

acquiring a semantic association graph associated with n source statements belonging to different modals, the semantic association graph comprising:

n semantic nodes of the different modals;

a first connecting edge used for connecting the semantic nodes of a same modal; and a second connecting edge used for connecting the semantic nodes of different modals, wherein the semantic nodes are used for expressing one semantic unit of the source statement under one modal, and n is a positive integer greater than 1;

extracting a plurality of first word vectors from the semantic association graph;

encoding the plurality of first word vectors to obtain n encoded feature vectors; and decoding the n encoded feature vectors to obtain a translated target statement.

15. The computer device according to claim 14, wherein acquiring the semantic association graph comprises:

acquiring n groups of semantic nodes, one group of semantic nodes corresponding to a source statement of one modal;

adding a first connecting edge between any two semantic nodes in the same modal; and adding a second connecting edge between any two semantic nodes of different modals, so as to obtain the semantic association graph.

16. The computer device according to claim 15, wherein:

the source statements of the n modals comprise a text-form first source statement and a non-text-form second source statement;

the n groups of semantic nodes comprise a first semantic node and a second semantic node; and acquiring the n groups of semantic nodes comprises:

acquiring the first semantic node by processing the first source statement, using a multimodal graph representation layer;

acquiring candidate semantic nodes by processing the second source statement using the multimodal graph representation layer;

acquiring a first probability distribution of the candidate semantic nodes, the first probability distribution being calculated through the multimodal graph representation layer according to a semantic association between the first semantic node and the candidate semantic nodes; and determining the second semantic node from among the candidate semantic nodes, the second semantic node being determined by the multimodal graph representation layer according to the first probability distribution.

17. The computer device according to claim 15, wherein adding the first connecting edge between any two semantic nodes of the same modal comprises:

adding an $i^{th}$ type of first connecting edge between any two semantic nodes in the same modal from among an $i^{th}$ group of semantic nodes, the $i^{th}$ type of first connecting edge corresponding to an $i^{th}$ modal, and i being a positive integer less than or equal to n.

18. The computer device according to claim 14, wherein:

the encoding the plurality of first word vectors to obtain the n encoded feature vectors is performed using a multimodal fusion encoder, including:

performing intra-modal fusion and inter-modal fusion on the plurality of first word vectors for e times to obtain the n encoded feature vectors, wherein the intra-modal fusion refers to semantic fusion between the first word vectors of the same modal, and the inter-modal fusion refers to semantic fusion between the first word vectors of different modals, e being a positive integer.

19. The computer device according to claim 18, wherein:

the multimodal fusion encoder comprises e serially-connected encoding modules;

each encoding module comprises n intra-modal fusion layers and n inter-modal fusion layers corresponding to the n modals one to one;

performing the intra-modal fusion and the inter-modal fusion on the plurality of first word vectors for e times to obtain the n encoded feature vectors comprises:

inputting the plurality of first word vectors into the n intra-modal fusion layers in the first encoding module respectively, and performing semantic fusion in the same modal on the plurality of first word vectors through the n intra-modal fusion layers, respectively, to obtain n first hidden layer vectors, one first hidden layer vector corresponding to one modal;

inputting the n first hidden layer vectors into each inter-modal fusion layer in the first encoding module, and performing semantic fusion between different modals on the n first hidden layer vectors through each inter-modal fusion layer to obtain n first intermediate vectors, one intermediate vector corresponding to one modal; and inputting the n first intermediate vectors into a jth encoding module for jth encoding processing until the last encoding module outputs n encoded feature vectors, one encoded feature vector corresponding to one modal, j being a positive integer greater than 1 and less than or equal to e.

20. A non-transitory computer-readable storage medium, storing a computer program, the computer program, when executed by one or more processors of a server system, cause the one or more processors to perform operations comprising:

acquiring a semantic association graph associated with n source statements belonging to different modals, the semantic association graph comprising:

n semantic nodes of the different modals;

a first connecting edge used for connecting the semantic nodes of a same modal; and a second connecting edge used for connecting the semantic nodes of different modals, wherein the semantic nodes are used for expressing one semantic unit of the source statement under one modal, and n is a positive integer greater than 1;

extracting a plurality of first word vectors from the semantic association graph;

encoding the plurality of first word vectors to obtain n encoded feature vectors; and decoding the n encoded feature vectors to obtain a translated target statement.

\* \* \* \* \*